US007292565B2

(12) United States Patent
Ono et al.

(10) Patent No.: US 7,292,565 B2
(45) Date of Patent: Nov. 6, 2007

(54) COMMUNICATION METHOD

(75) Inventors: Hideaki Ono, Kawasaki (JP);
Kazuyuki Oka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 10/635,209

(22) Filed: Aug. 6, 2003

(65) Prior Publication Data

US 2004/0072564 A1 Apr. 15, 2004

(30) Foreign Application Priority Data

Aug. 7, 2002 (JP) .............................. 2002-229879

(51) Int. Cl.
*H04L 12/28* (2006.01)
*H04Q 7/20* (2006.01)
(52) U.S. Cl. ............... 370/351; 370/395.32; 455/452.1
(58) Field of Classification Search ................ 370/313, 370/349, 331, 338, 351, 400, 328, 395.32, 370/352, 392; 709/245, 249; 455/445, 432.1, 455/517, 525, 452.1
See application file for complete search history.

(56) References Cited

U.S. PATENT DOCUMENTS

| | | | | |
|---|---|---|---|---|
| 5,345,474 A | * | 9/1994 | Hoshikawa | 375/219 |
| 5,708,655 A | * | 1/1998 | Toth et al. | 370/313 |
| 6,597,680 B1 | * | 7/2003 | Lindskog et al. | 370/347 |
| 7,042,879 B2 | * | 5/2006 | Eschbach et al. | 370/392 |
| 7,171,215 B2 | * | 1/2007 | Khouaja et al. | 455/452.2 |
| 2003/0088702 A1 | * | 5/2003 | Iwata et al. | 709/245 |
| 2004/0004967 A1 | * | 1/2004 | Nakatsugawa et al. | 370/400 |
| 2004/0103212 A1 | * | 5/2004 | Takeuchi et al. | 709/245 |
| 2004/0196797 A1 | * | 10/2004 | Lee et al. | 370/313 |
| 2005/0265360 A1 | * | 12/2005 | Kim et al. | 370/400 |
| 2006/0104244 A1 | * | 5/2006 | Kanagawa | 370/331 |
| 2006/0187881 A1 | * | 8/2006 | Kwak et al. | 370/331 |

FOREIGN PATENT DOCUMENTS

JP 2001-285359 10/2001

OTHER PUBLICATIONS

Notice of Reason for Rejection dated Jun. 26, 2007, for corresponding Japanese Application JP 2002-229879.
David B. Johnson, et al. "Mobility Support in IPv6", Jun. 1, 2002 <draft-ieft-mobileip-18.txt>, URL, http://www.watersprings.org/pub/id/draft-ieft-mobile ip-ipv6-18.txt., Rice University, Nokia Research Center.

* cited by examiner

*Primary Examiner*—Sonny Trinh
(74) *Attorney, Agent, or Firm*—Katten Muchin Rosenman LLP

(57) ABSTRACT

A communication method is capable of preventing an occurrence a change of a route for an underway communication between a mobile node and a correspondent node in a communication network and restraining an unnecessary packet from being forwarded to the correspondent node from the mobile node. The communication method is executed among the mobile node having a home address assigned in a first network and a temporary address assigned in a second network, an agent device surrogating a communication using the home address in the first network and a correspondent terminal communicating with the mobile node through the agent device. When the mobile node moves to the second network, the mobile node transmits information containing the temporary address to the correspondent node, and the correspondent node receives the information containing the temporary address and transmits the information to the temporary address of the mobile node.

18 Claims, 22 Drawing Sheets

FIG. 9

| No | ITEM | DESCRIPTION |
|---|---|---|
| 1 | IPv6 Address of Correspondent Node | Showing IPv6 address of correspondent node. |
| 2 | IPv6 Address of Self-Node | Showing IPv6 address of self-node. |
| 3 | Route Optimization State | Showing present route optimization between self-node and correspondent node.<br>0:On the Optimization of Route<br>1:Not yet Optimized Route |
| 4 | Route Optimization Halting Method | Showing route optimization halt control method.<br>1:Sending of Binding Update<br>2:Halt of sending Binding Update |
| 5 | Communication Monitoring Time | Showing time for monitoring halt of communication between self-node and correspondent node to halt route optimization.<br>1-65535 (sec), 0 is invalid |
| 6 | Communication Monitoring State | Showing communication state between self-node and correspondent node.<br>0:On the Communication<br>1:On the suspension of communication |

COMMUNICATION METHOD

BACKGROUND OF THE INVENTION

1. Field of the Invention

The present invention relates to a communication method in a mobile communication network.

2. Description of Related Art

The Internet nowadays performs an important role as the backbone of communication environments. A variety of problems, however, arise in the Internet technologies. One of those problems is concerned with a mobile node (which will hereinafter be abbreviated to MN) in mobile communications. This problem is that an IP address of the mobile node (MN) changes in a location to which the mobile node (MN) is connected, with the result that it is difficult to judge an identity of the mobile node (MN).

Such being the case, Mobile-IP is proposed as a mechanism for assuring connectivity with the mobile node (MN) without changing the IP address of the mobile node (MN).

According to Mobile-IP, a correspondent node (which will hereinafter be abbreviated to CN) forwards a packet to a home address defined as an address on a home link to which the mobile node (MN) is normally attached. On the other hand, a home agent intercepts the forwarded packet and forwards the packet to a care-of address assigned in the visited network of the mobile node (MN) Thus, the mobile node (MN) can receive the packet addressed to the home address.

According to Mobile-IP, however, the communication from the correspondent node (CN) to the mobile node (MN) must be performed via the home agent, and therefore, that the route becomes inefficient poses a problem.

This being the case, Mobile-IPv6 provides a route optimization function of forwarding and receiving the packet a route without through the home agent between the mobile node (MN) and the correspondent node (CN). FIG. 1 shows how the route optimization based on Mobile-IPv6 is set. Note that R1 through R3 represents routers in FIGS. 1 to 4.

Normally, the correspondent node (CN) forwards the packet to the home address defined as the address on the home link of the mobile node (MN) (S101).

On the other hand, the home agent intercepts the forwarded packet addressed to the home address of the mobile node (MN) (S102). Then, the home agent encapsulates the intercepted packet and forwards it to a care-of address assigned in a visited network of the mobile node (MN) (S103).

Then, the mobile node (MN) receives the encapsulated packet. The mobile node (MN), when receiving the forwarded packet, recognizes that the packet comes via the home agent. At this time, it is judged whether a security association between the correspondent node (CN) and the mobile node (MN) is established or not. Herein, if the security association is established, the mobile node (MN) requests the correspondent node (CN) to register a location of the mobile node (MN) and executes a route optimization. Therefore, the mobile node (MN) sends the present care-of address as Binding Update to the correspondent node (CN) (S104). Herein, the information on the location of the mobile node (MN) implies information containing the present care-of address assigned in the visited network of the mobile node (MN).

Further, the state where "the security association is established" is a state in which a database on the mobile node (MN) is stored with a security parameter index (SPI) value coincident with the forwarded packet, and a destination address. The security (authentication of the sender, a safe protection of the data, a protection of reply, etc.) is ensured.

Further, Binding is defined as information retained in a Binding cache on the home agent, namely information about the relationship between the home address of the mobile node (MN) and the care-of address assigned in the visited network of the mobile node (MN). Binding Update implies an update of Binding information.

Then, the correspondent node (CN) receives Binding Update sent from the mobile node (MN), and retains the information about the location of the mobile node (MN) (S105). The correspondent node (CN) acquires the care-of address of the mobile node (MN) from the location information of the mobile node (MN).

From this onwards, the packet to the mobile node (MN) is forwarded to the care-of address (S106). Therefore, the packet addressed to the care-of address, which is forwarded from the correspondent node (CN), can reach the mobile node (MN) via an optimal route between the correspondent node and the mobile node without through the home agent.

As described above, according to Mobile-IPv6, the route optimization can be set. Namely, it is possible to thus perform the communication between the mobile node (MN) and the correspondent node (CN) without through the home agent.

Next, FIG. 2 shows how the route optimization based on Mobile-IPv6 is maintained. The mobile node (MN) sends again Binding Update before an expiration of a predetermined time (which will hereinafter be referred to as a lifetime) set in Binding Update in order to keep the location information sent to the correspondent node (CN). Normally, with this operation, Binding Update continues to be periodically sent to the correspondent node (CN) from the mobile node (MN) (S201).

Then, the correspondent node (CN) receives Binding Update from the mobile node (MN) and updates the location information, thereby keeping the route optimization (S202).

Further, what is proposed as a protocol over Mobile-IPv6 is Hierarchical Mobile-IPv6 for concealing a mobility within a network administered by a mobility anchor point from the home agent by providing a node, i.e., the mobility anchor point (MAP) corresponding to the surrogate home agent in a visited network of the mobile node (MN). FIG. 3 shows how the route optimization based on Hierarchical Mobile-IPv6 is set.

Normally, the correspondent node (CN) forwards the packet to the home address which is an address on the home link of the mobile node (MN) (S301).

On the other hand, the home agent intercepts the packet addressed to the home address of the mobile node (MN) (S302). Then, the home agent encapsulates the intercepted packet and forwards this packet to a regional care-of address as an address under the mobility anchor point of the mobile node (MN) (s303).

Subsequently, the mobility anchor point receives the packet addressed to the regional care-of address, which has been forwarded from the home agent (S304). Thereafter, the mobility anchor point encapsulates the packet addressed to the regional care-of address and forwards this encapsulated packet to an on-link care-of address of the mobile node (MN) (S305).

Ensuingly, the mobile node (MN), when receiving the packet, recognizes that this packet comes via the home address. At this time, it is judged whether the security association between the correspondent node (CN) and the mobile node (MN) is established or not. Herein, if the security association is established, the mobile node (MN)

applies the route optimization by registering its location on the correspondent node (CN), and therefore sends Binding Update to the correspondent node (CN) (S306).

On the other hand, the correspondent node (CN) receives Binding Update sent from the mobile node (MN) thereby retaining the information about the location of the mobile node (MN) (S307). At this time, the regional care-of address is registered in an item "care-of address" in the location information. Namely, the correspondent node (CN) can acquire the regional care-of address of the mobile node (MN) from within the location information of the mobile node (MN).

Then, the correspondent node (CN), from this onwards, forwards to the mobile node (MN) the packet to the regional care-of address thereof (S308). Subsequently, the mobility anchor point receives the packet addressed to the regional care-of address from the correspondent node (CN) (S309). Therefore, the packet addressed to the regional care-of address from the correspondent node (CN) can reach the mobility anchor point via an optimal route between the correspondent node (CN) and the mobility anchor point without through the home agent. Subsequently, the mobility anchor point encapsulates the packet addressed to the regional care-of address and forwards this encapsulated packet to the on-link care-of address of the mobile node (MN) (S310).

As described above, according to Hierarchical Mobile-IPv6, the route optimization can be set as based on Mobile-IPv6. That is to say, it is possible to thus perform the communication between the mobile node (MN) and the correspondent node (CN) via the mobility anchor point without through the home agent.

FIG. 4 shows how the route optimization based on Hierarchical Mobile-IPv6 is maintained. The mobile node (MN) sends again Binding Update before the expiration of the predetermined time (lifetime) set in Binding Update in order to keep the location information sent to the correspondent node (CN). Normally, with this operation, Binding Update continues to be periodically sent to the correspondent node (CN) from the mobile node (MN) (S401). Then, the correspondent node (CN) receives Binding Update from the mobile node (MN) and updates the location information (S402), thereby keeping the route optimization.

A start of the route optimization in the prior art described above is triggered by the process that the mobile node (MN) receives the packet from the correspondent node (CN). Accordingly, there might be a case where the packet forwarding route is to be changed in an underway communication from the corresponding node (CN) to the mobile node (MN).

If the route optimization is executed during the communication between the mobile node (MN) and the correspondent node (CN), the communication route is changed, a packet after undergoing the route optimization might arrive at the mobile node (MN) earlier than a packet before undergoing the route optimization. Consequently, a sequence reverse of the packets occurs due to this inconsistency.

Moreover, a retransmission of the packet because of the occurrence of the sequence reverse of the packets leads to an increase in network traffic. As a result, a throughput decreases.

Further, according to the prior art, after executing the route optimization, the mobile node (MN) continues to periodically send, to the correspondent node (CN), Binding Update for updating the location information in order to maintain the route optimization.

Consequently, the continuous communications have been halted after the route optimization has been executed between the mobile node (MN) and the correspondent node (CN), and nevertheless the location information for keeping the route optimization continues to be sent to the correspondent node (CN) from the mobile node (MN). This conduces to an occurrence of an unnecessary traffic in the network. Further, the correspondent node (CN) continues to hold unnecessary pieces of information, resulting in a futility of resources.

SUMMARY OF THE INVENTION

It is a primary object of the present invention, which was devised in view of the problems inherent in the prior art, to provide a communication method capable of preventing an occurrence of a change in route that is underway of communications and restraining an unnecessary packet from being forwarded to a correspondent node (CN) from a mobile node (MN).

To accomplish the above object, according to a first aspect of the present invention, a communication method executed among a mobile terminal having a home address assigned in a first network and a temporary address assigned in a second network, an agent device surrogating a communication using the home address in the first network and a correspondent terminal communicating with the mobile terminal through the agent device, includes making the mobile terminal transmit, when the mobile terminal moves to the second network, information containing the temporary address to the correspondent terminal, making the correspondent terminal receive the information containing the temporary address of the mobile terminal, and making the correspondent terminal transmit, to the mobile terminal, the information addressed to the temporary address of the mobile terminal, wherein a communication route without through the agent device is established in advance of starting the communication between the mobile terminal and the correspondent terminal.

Herein, the mobile terminal is called a mobile node, and the correspondent terminal is referred to as a correspondent node. Further, the agent device is a router on a link of the mobile terminal, and this router assigns a temporary address to the mobile terminal in a network to which the mobile terminal is attached. Then, when the mobile terminal moves away from a home network, the agent device forwards the information addressed to the home address of the mobile terminal to the temporary address of the mobile terminal.

This piece of information contains address information, etc. of the correspondent terminal, and hence the mobile terminal can send self-location information to the correspondent terminal. The location information contains the temporary address, etc. assigned in a visited network.

Then, the correspondent terminal receiving the location information of the mobile terminal can, from this onwards, send the information directly to the mobile terminal without through the agent device.

Further, the communication route is not changed for executing the route optimization of which the initiative is taken by the mobile terminal in advance of starting the communication with the correspondent terminal. Namely, the mobile terminal sends the self-location information to the correspondent terminal before starting the communication between the mobile terminal and the correspondent terminal, so that the change in the communication route can be restrained. It is therefore feasible to restrain the information after undergoing the route optimization from reaching the mobile terminal earlier than the information before undergoing the route optimization. Accordingly, the sequence reverse of the packets does not occur, and hence there is no necessity of retransmitting the packet. It is therefore possible to restrain the increases both in the network traffic and in throughput.

According to a second aspect of the present invention, the communication method may further include confirming before starting the communication between the mobile terminal and the correspondent terminal whether a request for security is met or not.

With this scheme, the mobile terminal confirms the security about the correspondent terminal.

Accordingly, the mobile terminal can send the information containing the self-temporary address to the correspondent terminal in safety.

According to a third aspect of the present invention, the communication method may further include detecting that there is no communication between the mobile terminal and the correspondent terminal for a predetermined period, and transmitting, when detecting that there is no communication between the mobile terminal and the correspondent terminal, a piece of information for canceling the communication route.

Further, the communication method may further include detecting that there is no communication between the mobile terminal and the correspondent terminal for the predetermined period, and stopping, when detecting that there is no communication between the mobile terminal and the correspondent terminal, a transmission of a piece of information for keeping the communication route.

Herein, the process of detecting that there is no communication between the mobile terminal and the correspondent terminal for the predetermined period implies that a communication state indicates "suspension of communication" during the predetermined time interval.

In this case, there may be taken either a method by which the mobile terminal sends information for canceling the communication route to the correspondent terminal or a method by which the mobile terminal stops the periodic transmission of the information for maintaining the communication route to the corresponding terminal, and a predetermined duration time contained in the location information stored on the correspondent terminal.

With this scheme, it is possible to restrain the information for keeping the communication route from continuing to be sent to the correspondent terminal from the mobile terminal in spite of halting the continuous communication after establishing the communication route between the mobile terminal and the correspondent terminal without through the agent device. It is therefore feasible to restrain both an unnecessary traffic from occurring in the network and the correspondent terminal from continuing to hold the unnecessary information, whereby the futility of the resources can be restrained.

According to a fourth aspect of the present invention, the communication method may further include storing information showing that the communication route without through the agent device is once established between the mobile terminal and the correspondent terminal, and re-establishing the communication route without through the agent device on the basis of the information stored with respect to the communication route.

With this scheme, the mobile terminal takes the initiative of executing the route optimization before starting the normal communication with the correspondent terminal. Hence it is possible to restrain that the information behind the route optimization reaches the mobile terminal earlier than the information before the route optimization due to a change of the communication route.

Accordingly, the sequence reverse of the packets does not occur, and consequently the retransmission thereof is not needed. Hence, there is neither the increase in the network traffic nor the decrease in the throughput.

Moreover, according to the present invention, there is provided a program read by a computer to actualize any one of the functions described above. According to the present invention, there is further provided a readable storage medium stored with this program.

BRIEF DESCRIPTION OF THE DRAWINGS

Other objects and advantages of the present invention will become apparent during the following discussion in conjunction with the accompanying drawings, in which:

FIG. 9 is a diagram showing a structure of route optimization control information;

DETAILED DESCRIPTION OF THE PREFERRED EMBODIMENTS

Preferred embodiments of the present invention will hereinafter be described with reference to the accompanying drawings.

First Embodiment

Figure 1:
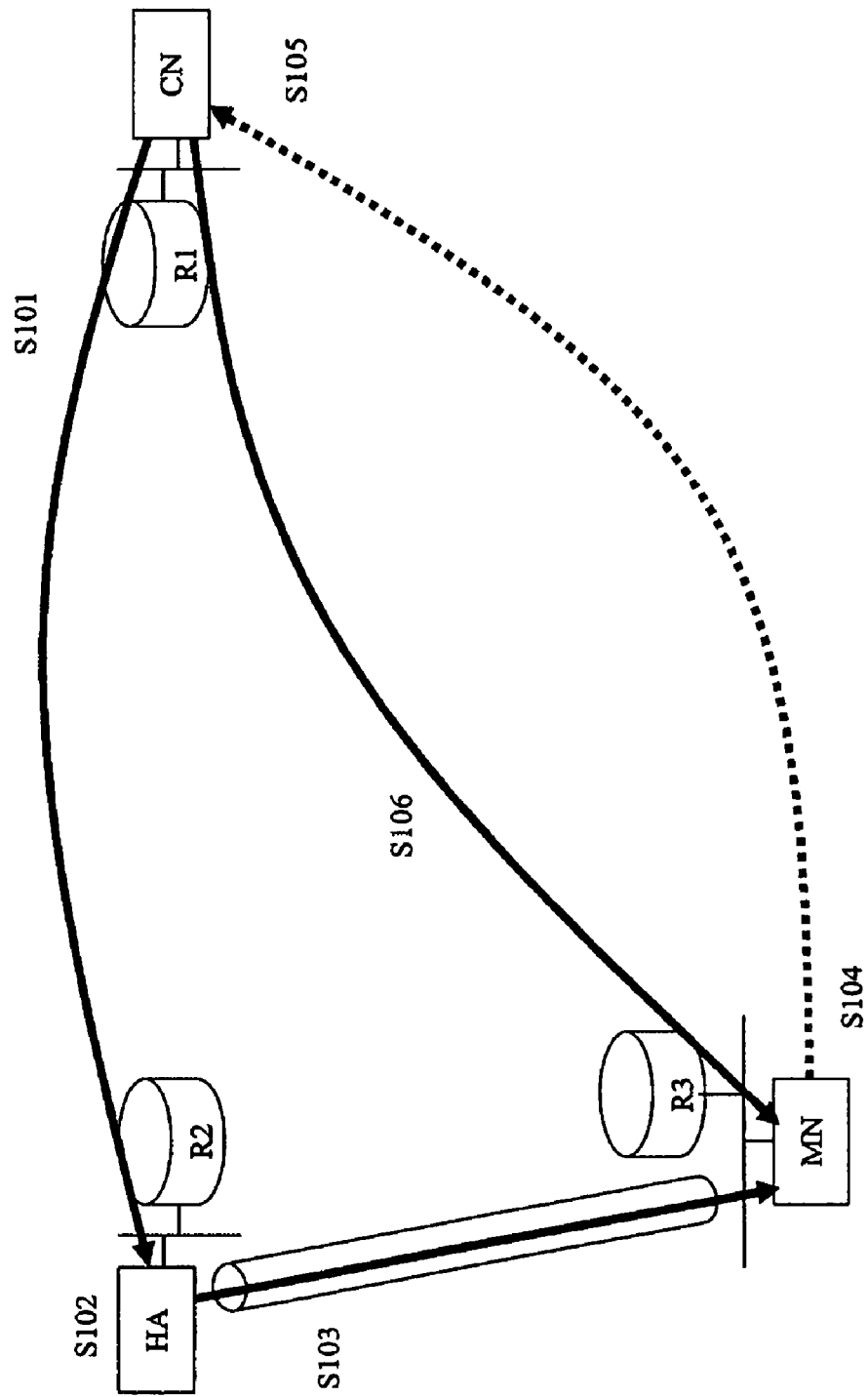
FIG. 1 is a view showing a system for setting a route optimization based on Mobile-IPv6 in the prior art.
Figure 2:
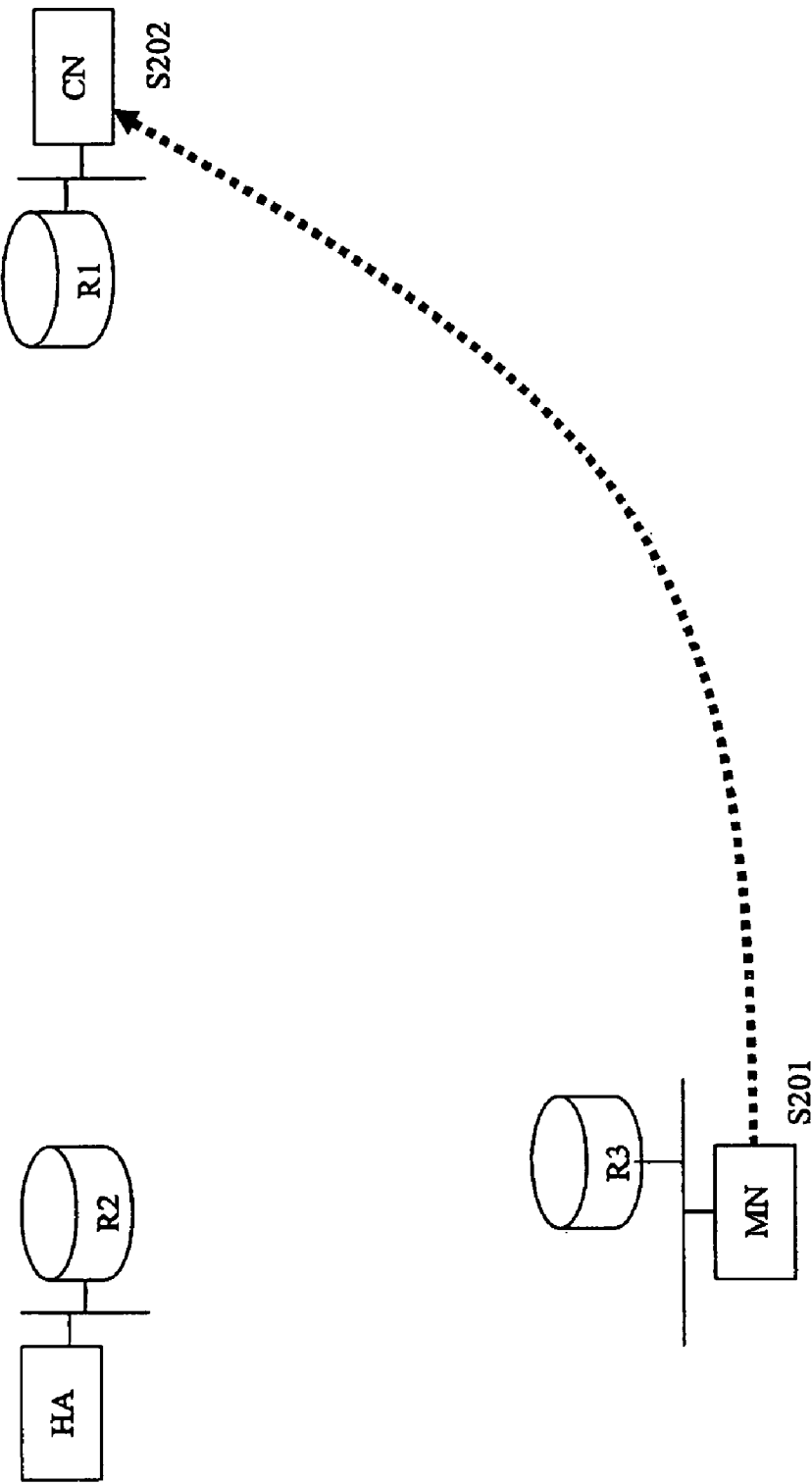
FIG. 2 is a view showing a system for maintaining the route optimization based on Mobile-IPv6 in the prior art.
Figure 3:
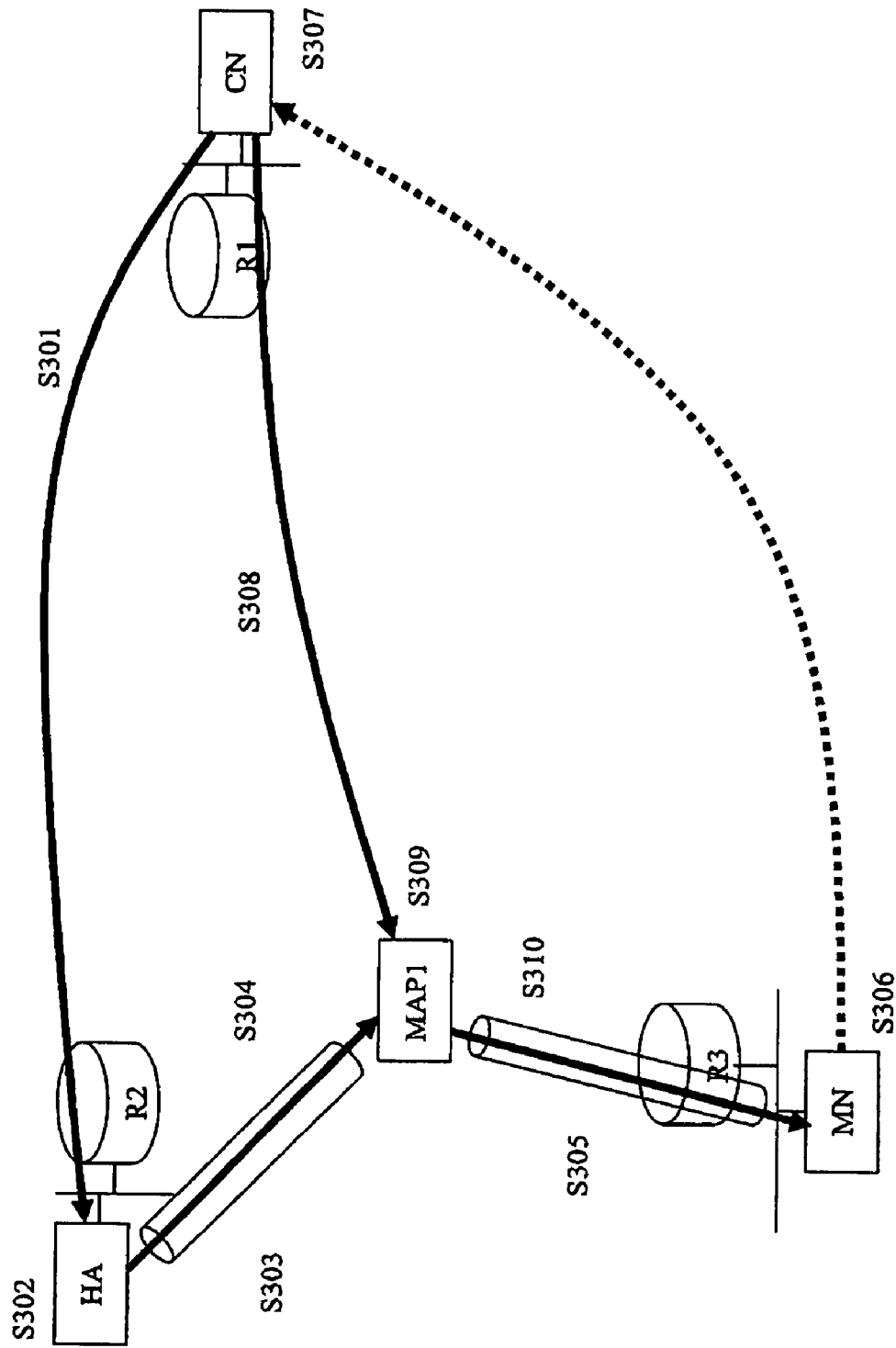
FIG. 3 is a view showing a system for setting the route optimization based on Hierarchical Mobile-IPv6 in the prior art.
Figure 4:
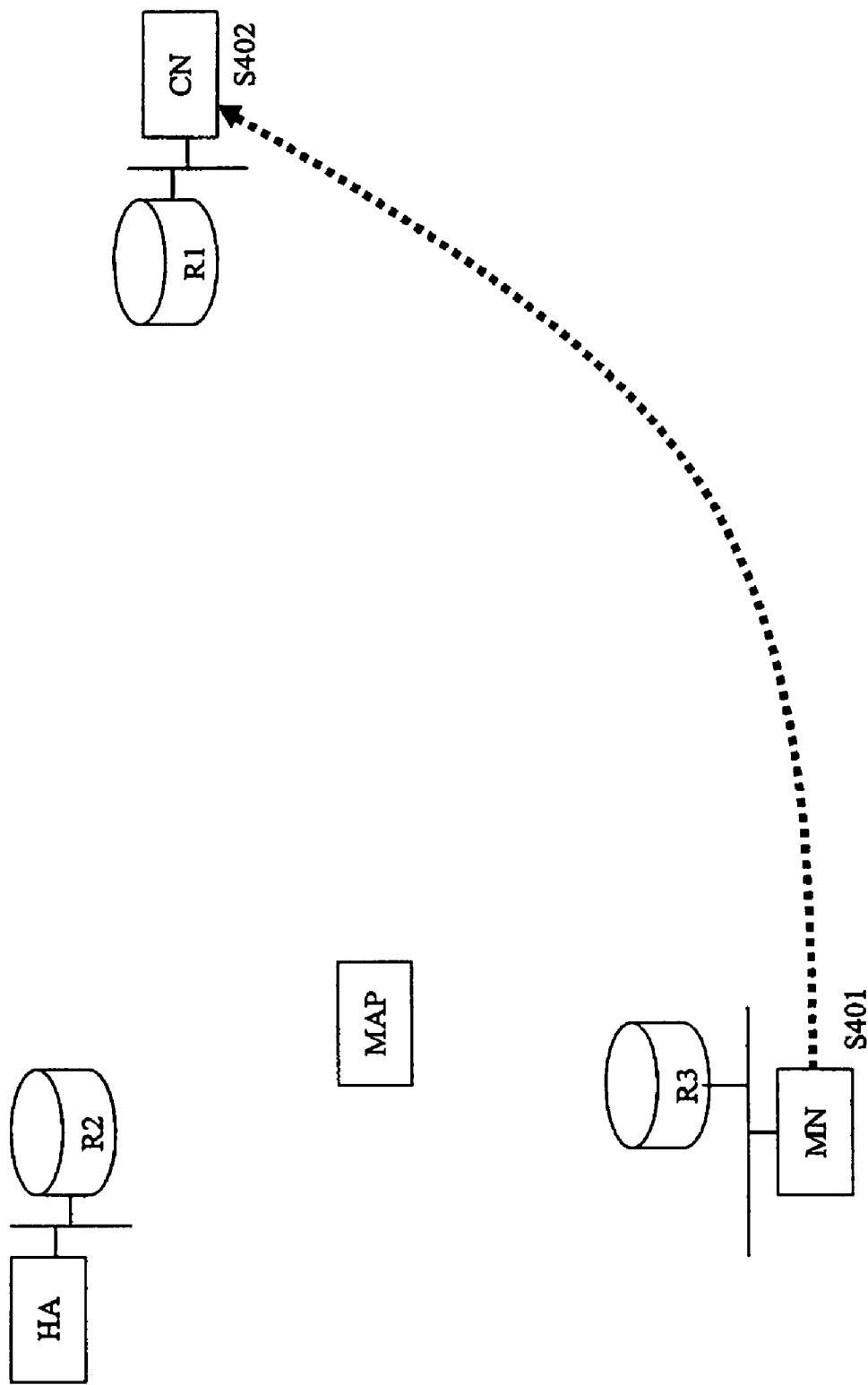
FIG. 4 is a view showing a system for maintaining the route optimization based on Hierarchical Mobile-IPv6 in the prior art.
Figure 5:
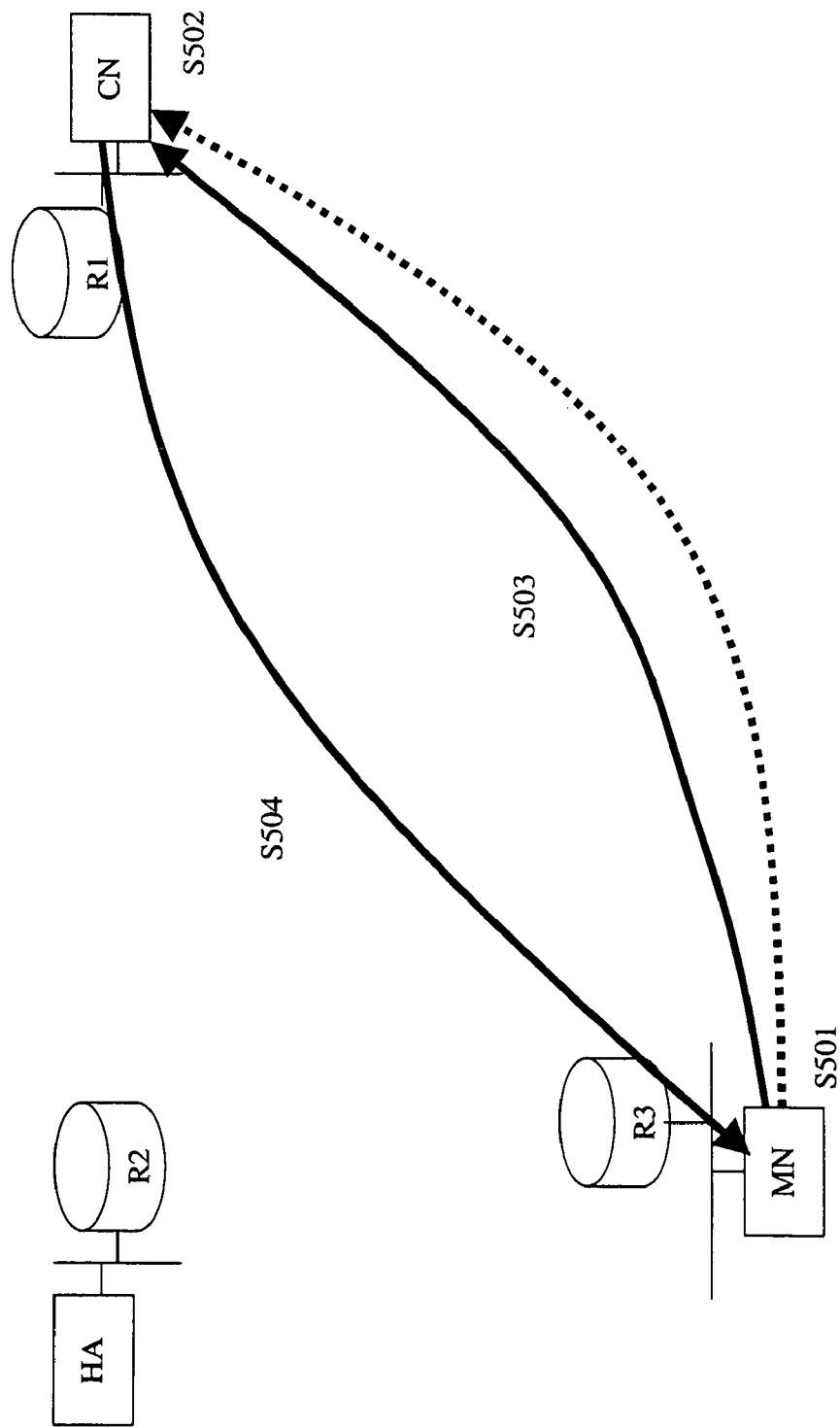
FIG. 5 is a view showing a system for setting the route optimization based on Mobile-IPv6.
Figure 6:
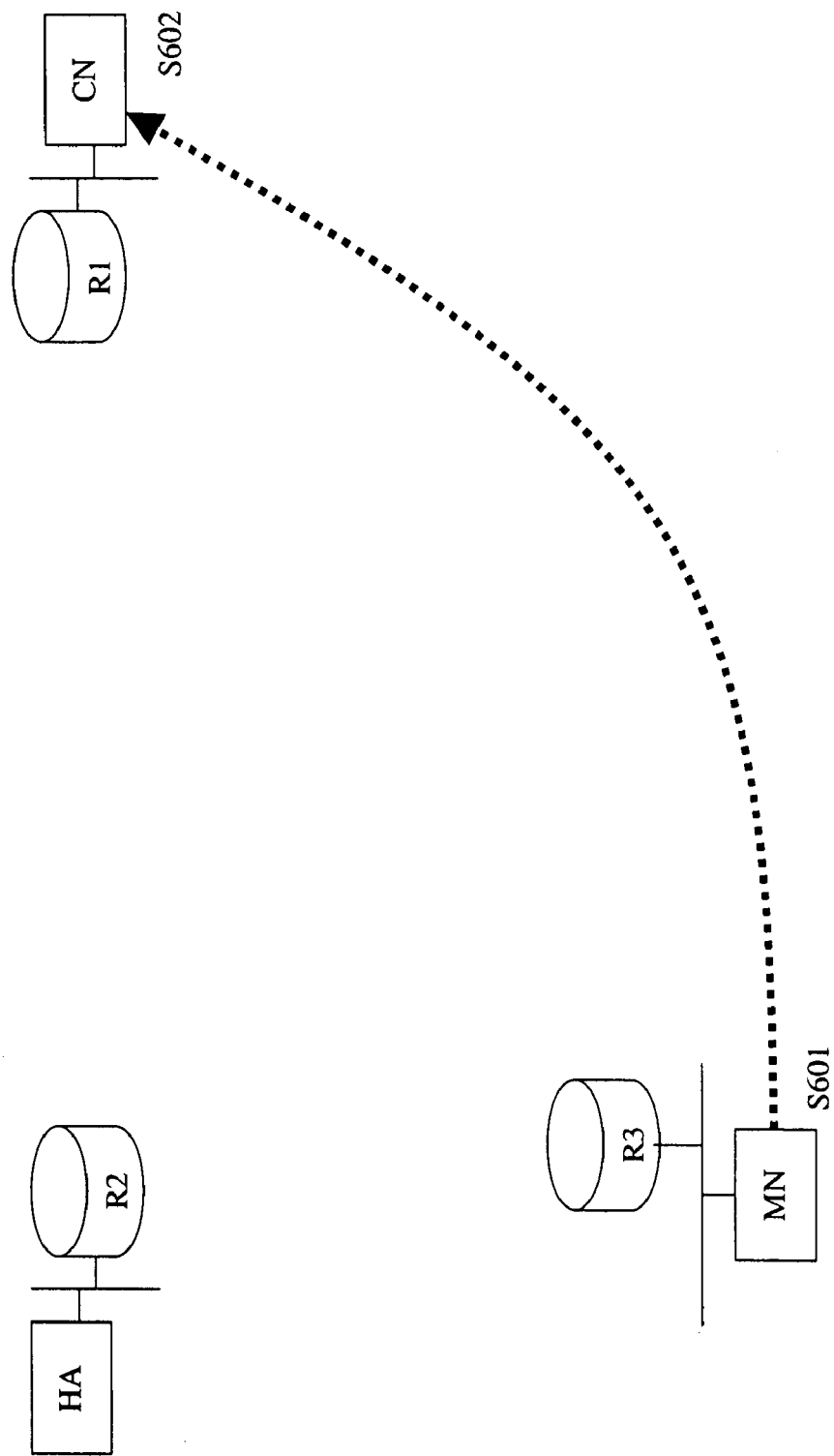
FIGS. 6 and 7 are views showing how the route optimization based on Mobile-IPv6 is halted.
Figure 7:
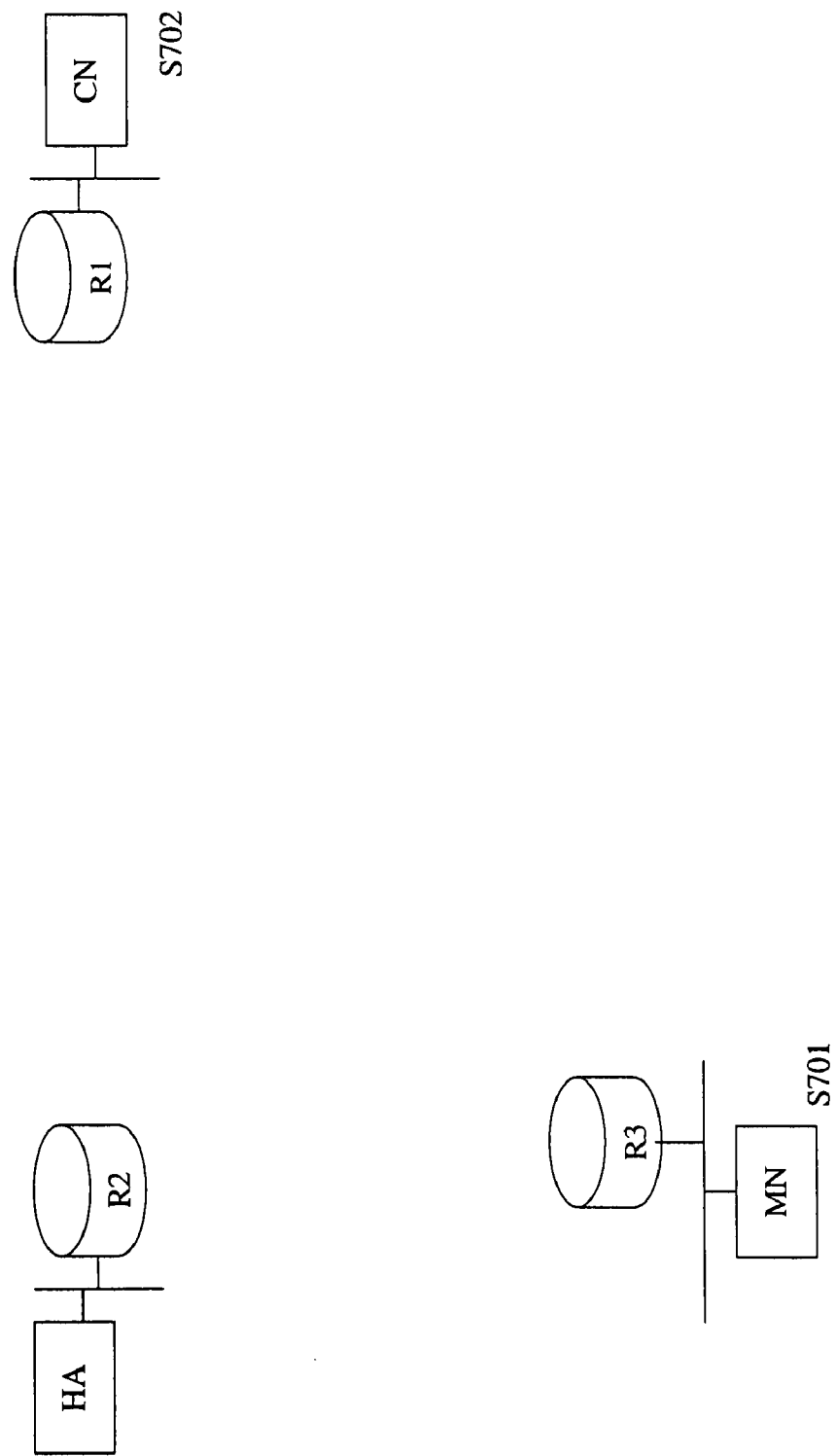
Figure 8:
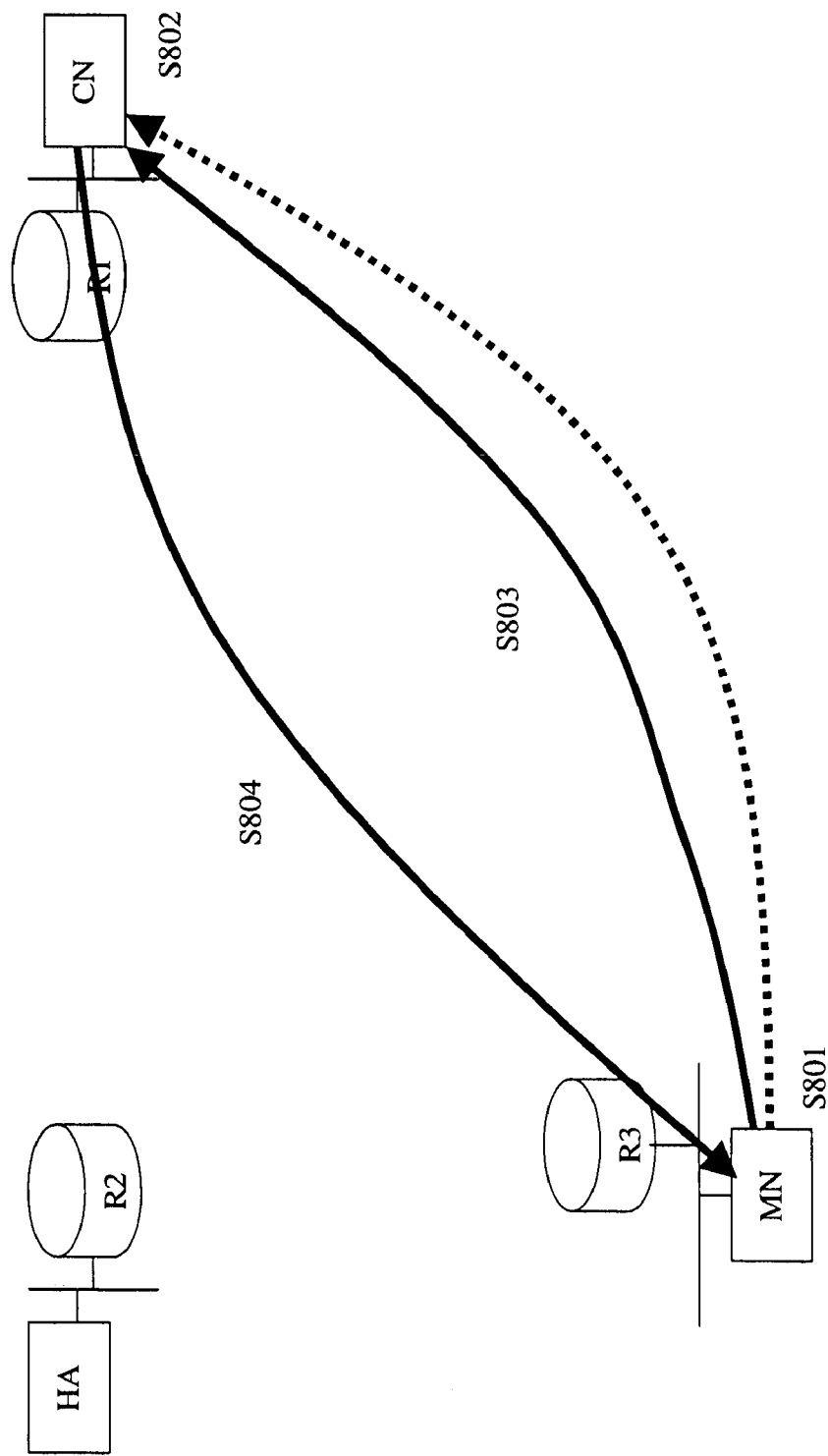
FIG. 8 is a view showing how a route re-optimization based on Mobile-IPv6 is set.

A communication system in a first embodiment of the present invention will hereinafter be discussed with reference to FIGS. 5 through 18. FIG. 5 is a view showing system architecture for setting a route optimization based on Mobile-IPv6. FIGS. 6 and 7 are views showing how the route optimization based on Mobile-IPv6 is halted. FIG. 8 is a view showing how a route re-optimization based on Mobile-IPv6 is set.

Figure 10:
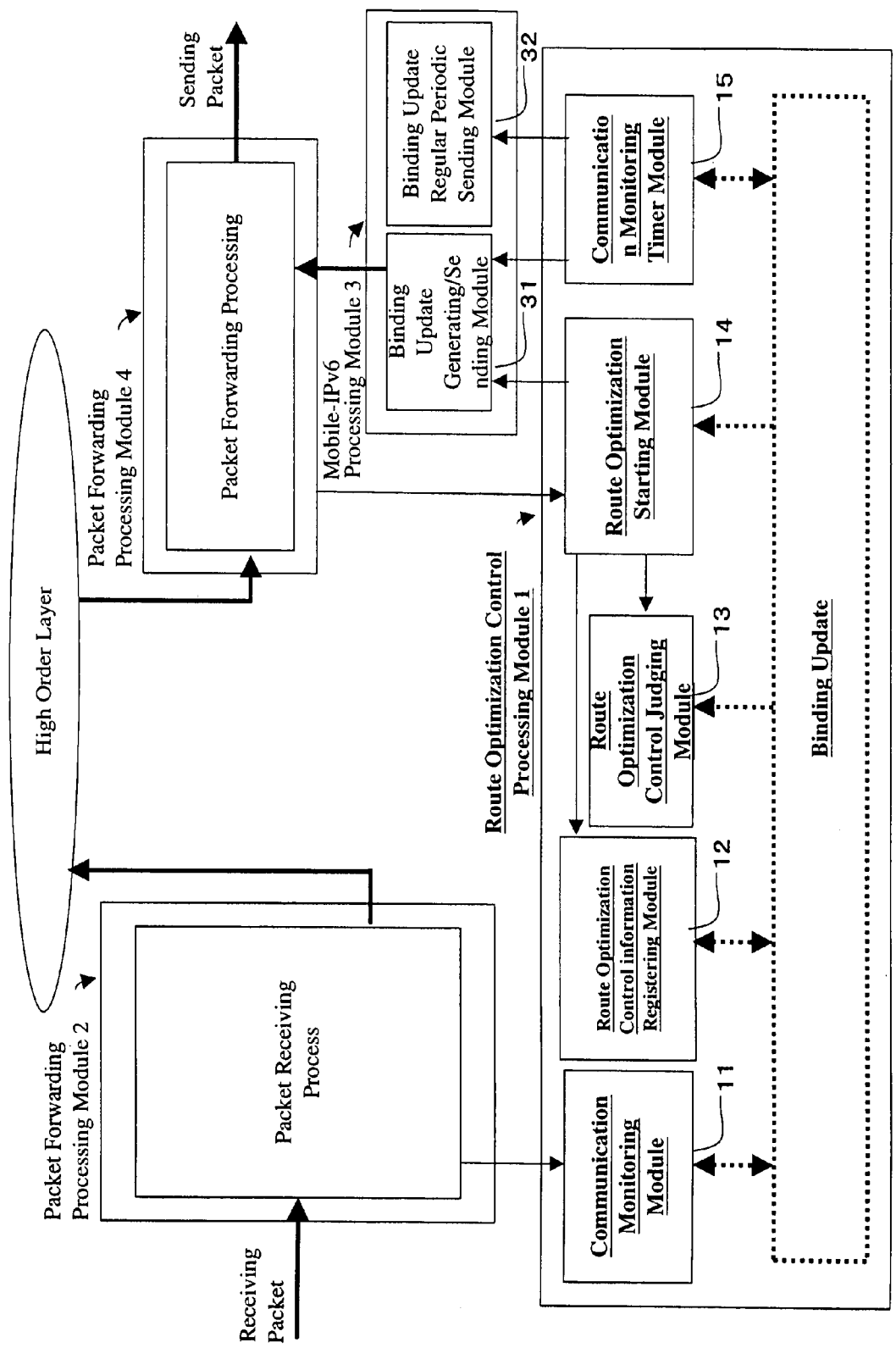
FIG. 10 is a diagram showing architecture of a route optimization control system on a mobile node.
Figure 11:
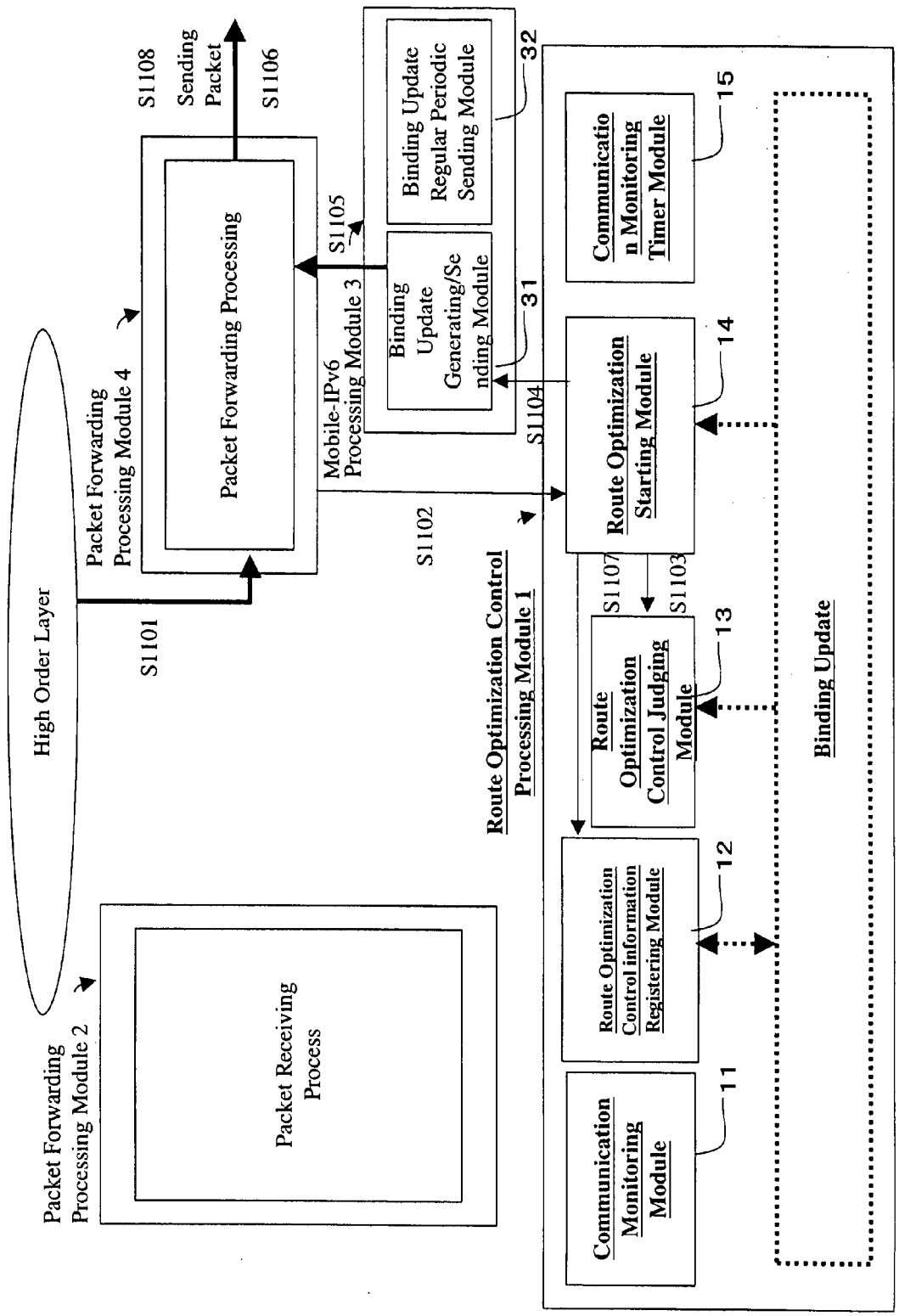
FIG. 11 is a block diagram showing how the route optimization control is started.
Figure 12:
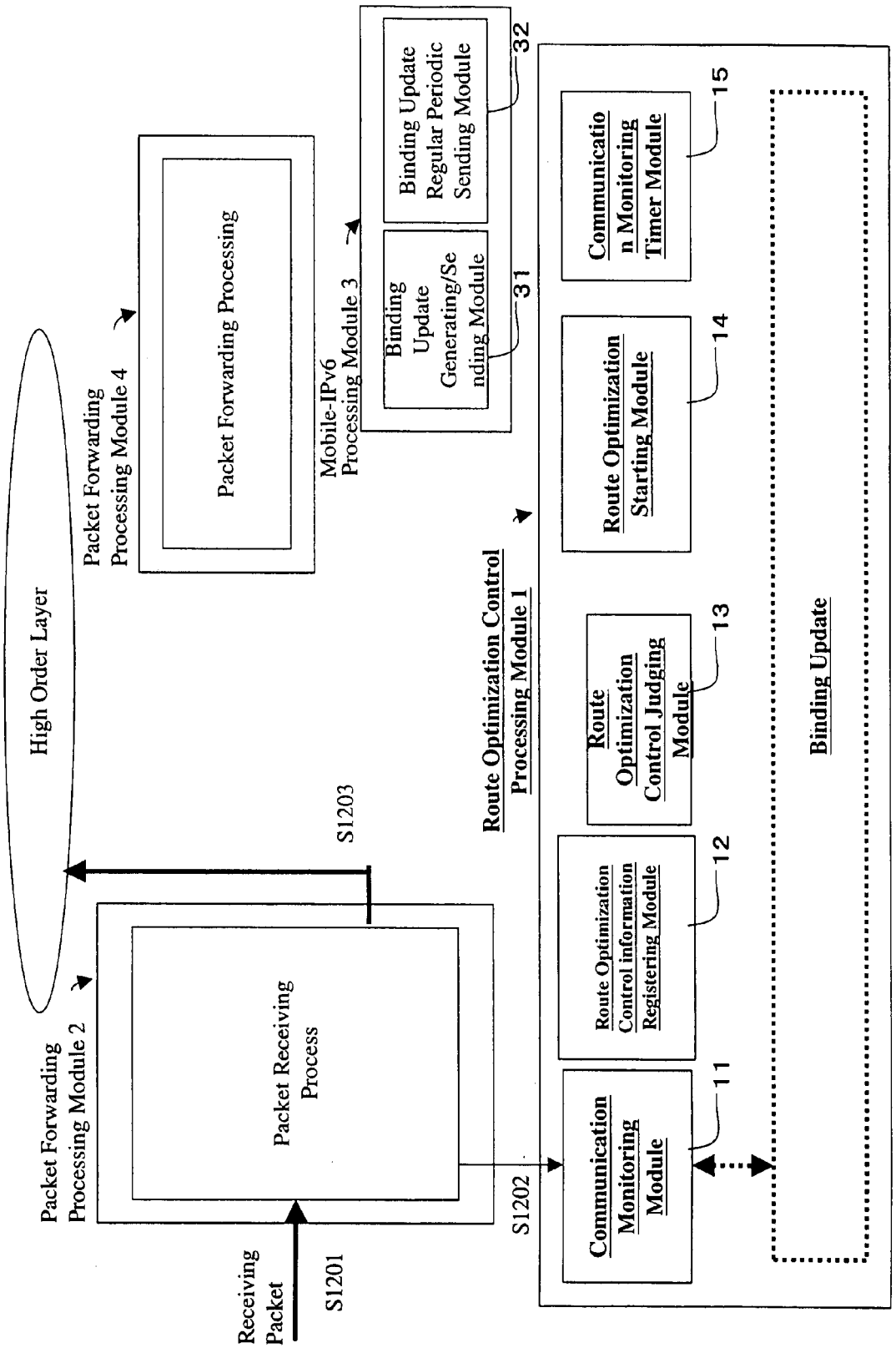
FIG. 12 is a block diagram showing how a communication for the route optimization control is monitored.
Figure 13:
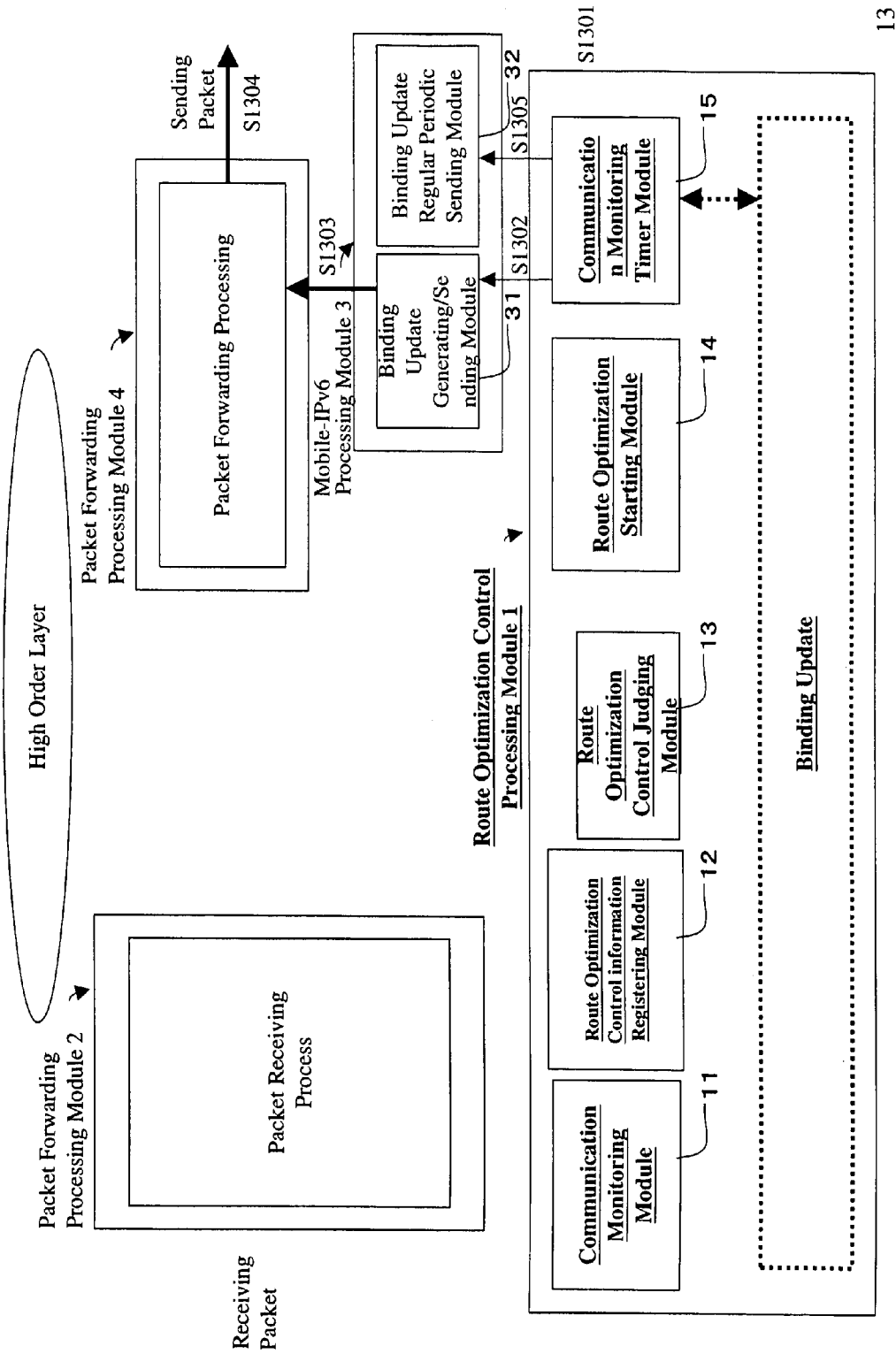
FIG. 13 is a block diagram showing the halt of the route optimization control.
Figure 14:
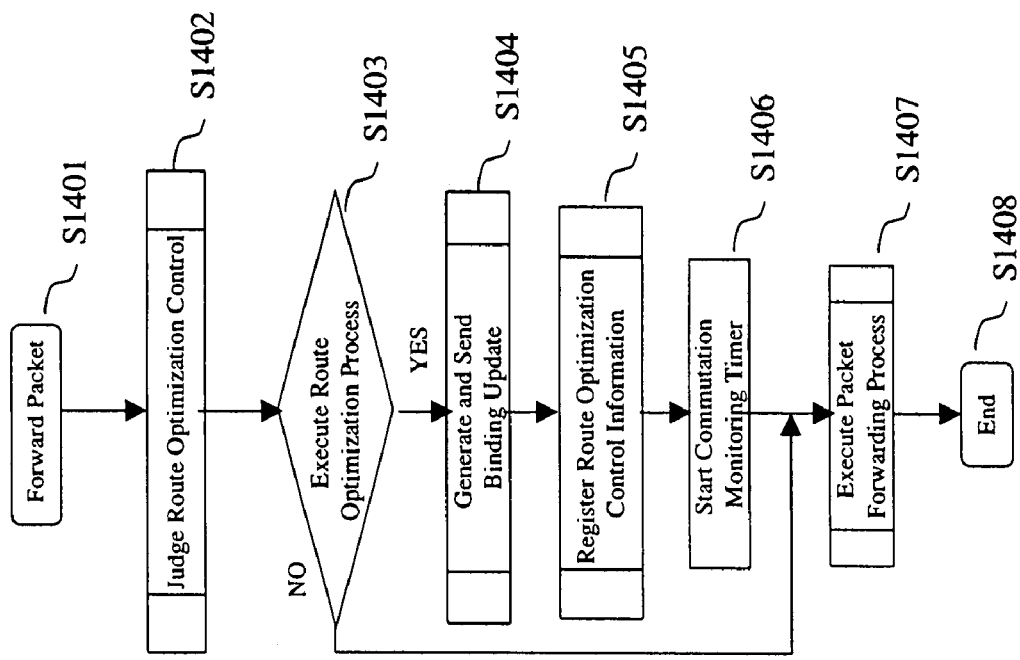
FIG. 14 is a flowchart showing the start of the route optimization control.
Figure 15:
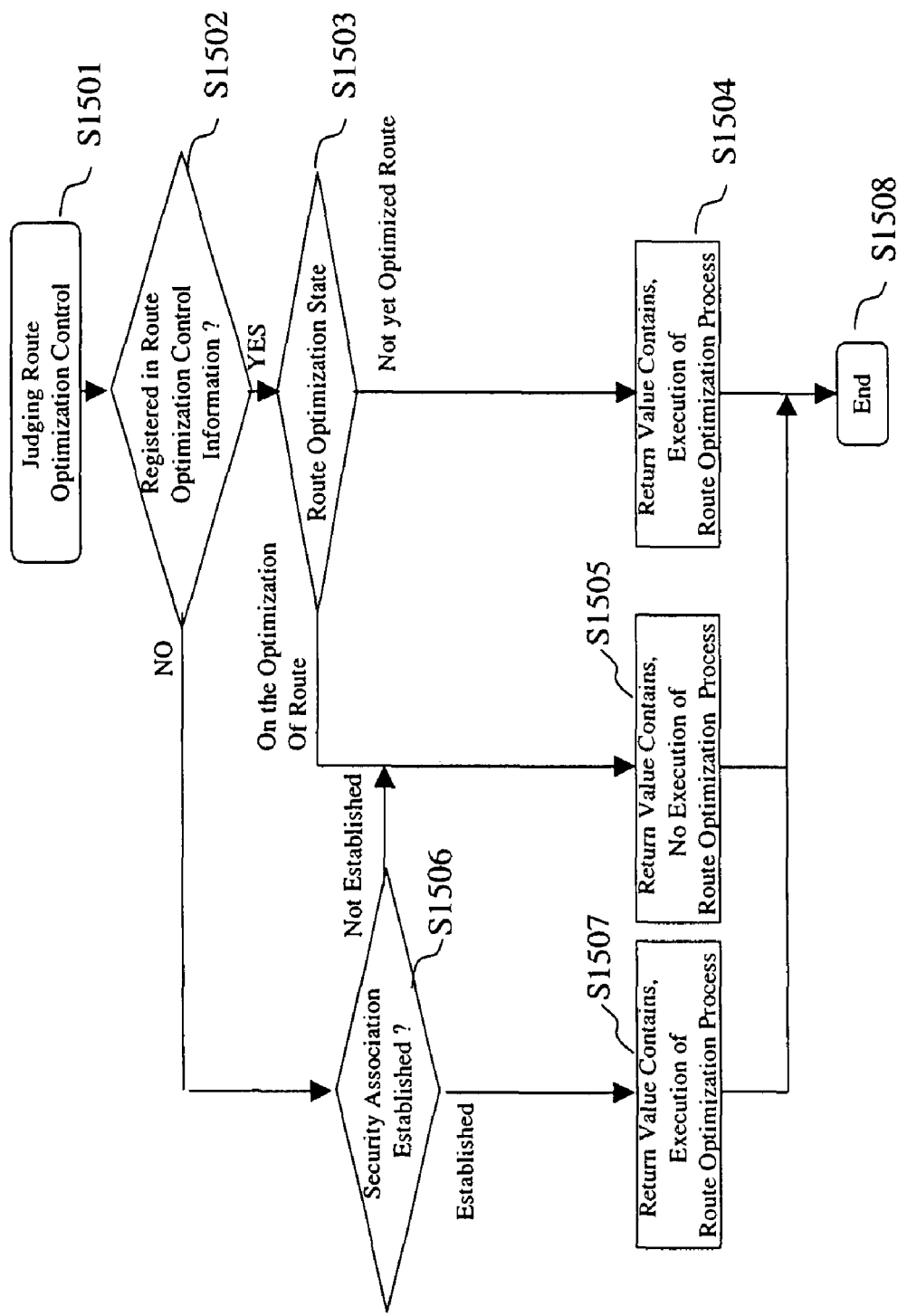
FIG. 15 is a flowchart showing a judgement of route optimization control.
Figure 16:
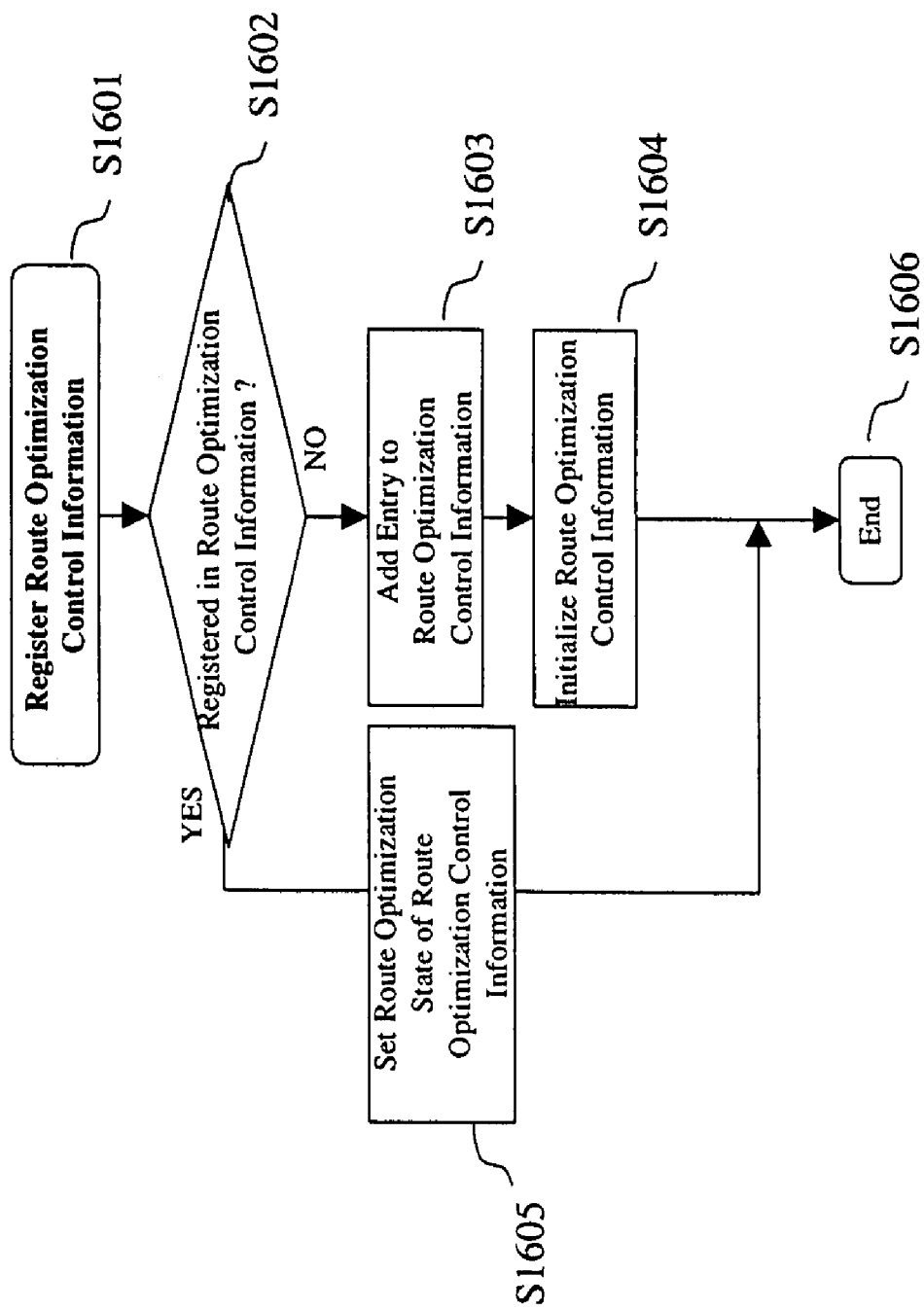
FIG. 16 is a flowchart showing a registration of information for the route optimization control.
Figure 17:
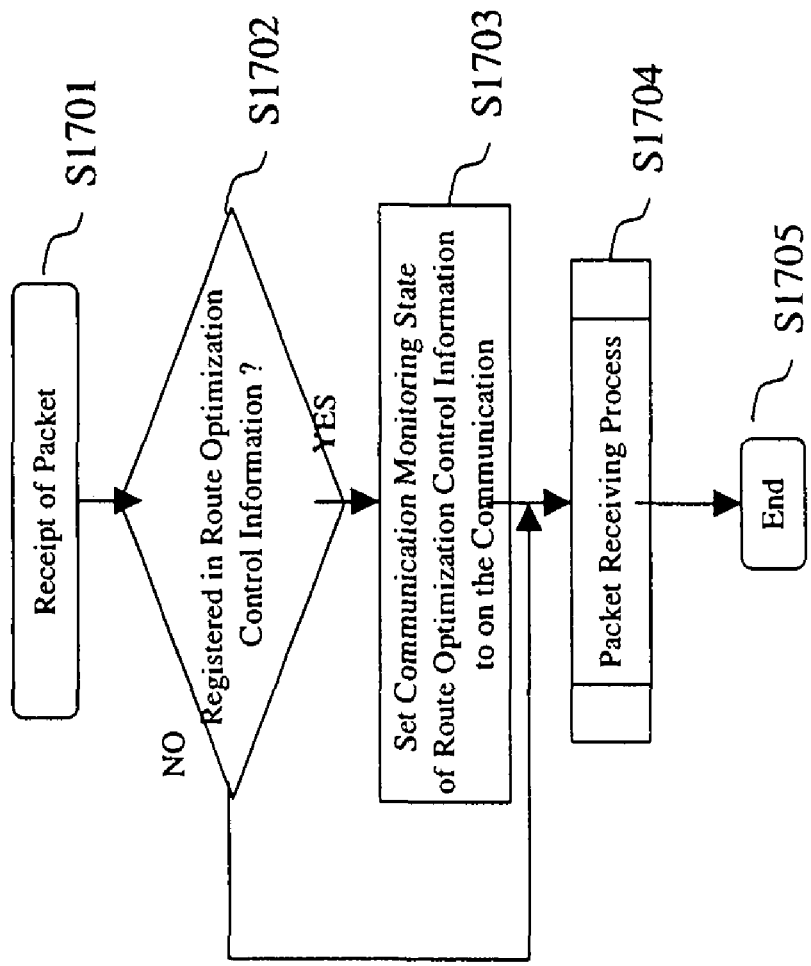
FIG. 17 is a flowchart showing the monitoring of the communication for the route optimization control.
Figure 18:
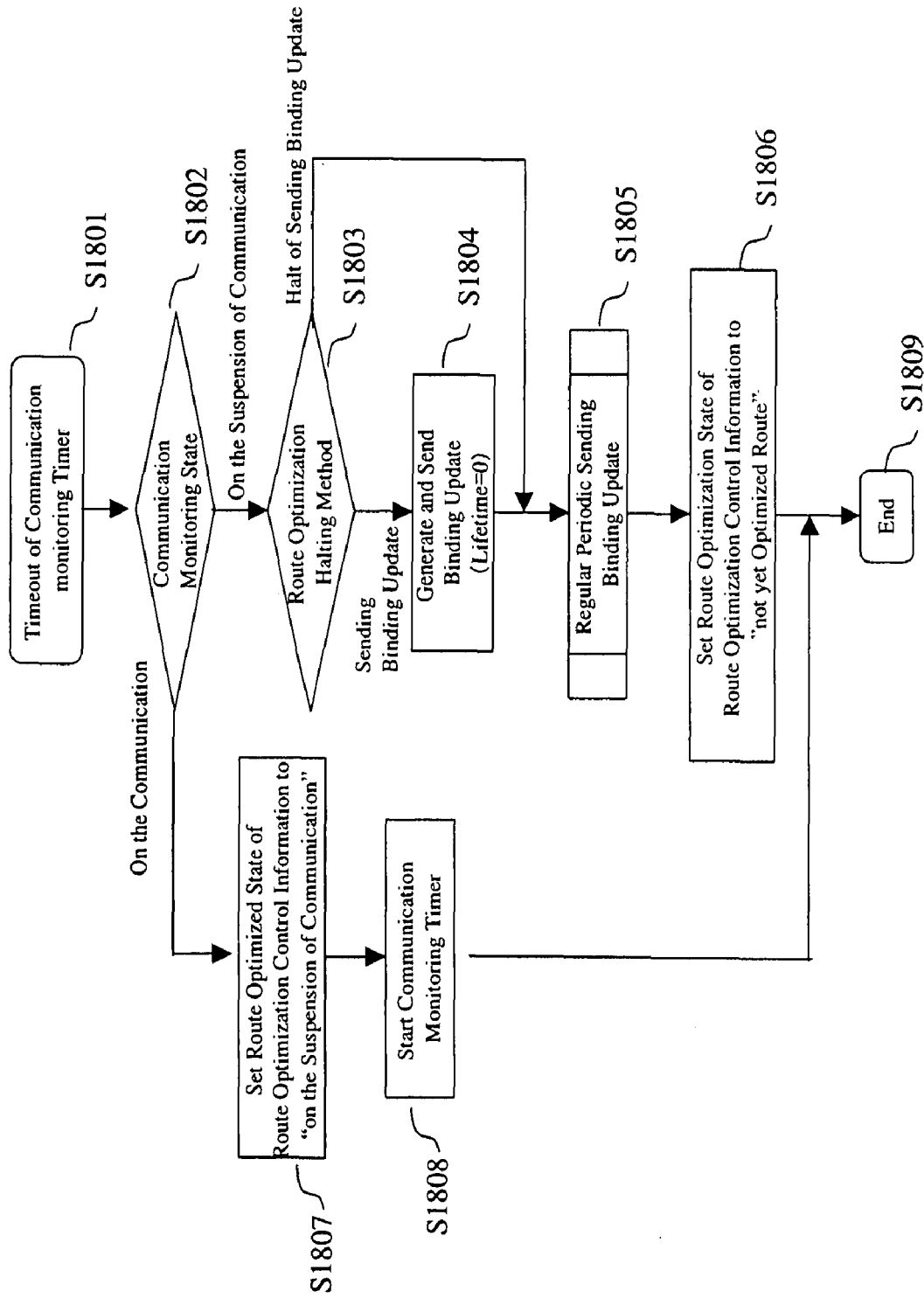
FIG. 18 is a flowchart showing a halt of the route optimization control.

Further, FIG. 9 is a diagram showing a structure of route optimization control information. FIG. 10 is a diagram showing architecture of a route optimization control system on a mobile node (MN). FIG. 11 is a block diagram showing how the route optimization control is started. FIG. 12 is a block diagram showing how a communication for the route optimization control is monitored. FIG. 13 is a block diagram showing the halt of the route optimization control. FIG. 14 is a flowchart showing the start of the route optimization control. FIG. 15 is a flowchart showing a judgement of route optimization control. FIG. 16 is a flowchart showing a registration of information for the route optimization control. FIG. 17 is a flowchart showing the monitoring of the communication for the route optimization control. FIG. 18 is a flowchart showing a halt of the route optimization control.

<Outline of Route Optimization Control Method>

A route optimization control method in the first embodiment will hereinafter be discussed referring to FIG. 5. Herein, the symbol "MN" represents a mobile node, and "CN" designates a correspondent node. Further, "HA" stands for a home agent.

Herein, the mobile terminal (node) is defined as a node capable of changing a location of the connection from a home link to a different link. Further, the mobile terminal is also called a mobile node (MN). Then, the corespondent node is defined as a paired node with which the mobile node communicates.

The home agent is a router on the home link of the mobile node and is registered with a present care-of address of the mobile node. The home agent, when the mobile node is not on the host link, forwards a packet addressed to a Home address of the mobile node to the MN's care-of address registered therein.

Further, the symbols R (1 through 3) respectively represent routers.

To start with, the mobile node (MN), when a communication with the correspondent node (CN) occurs, checks whether a security association between the mobile node (MN) and the correspondent node (CN) is established or not. Then, if the security association is established, the mobile node (MN) judges that the route optimization to the correspondent node (CN) can be carried out, and sends Binding Update before starting the communication in order to optimize the route to the correspondent node (CN) (S501). Herein, "Binding Update" is defined as a message used for the mobile node to notify the correspondent node of the present self care-of address.

In this case, Binding Update may be sent as a normal packet destination header and can be also sent by a piggy backing system.

Further, on this occasion, the mobile node (MN) records, as route optimization control information (see FIG. 9), information of the correspondent node (CN) to which the route optimization has been executed.

On the other hand, the correspondent node (CN), which has received Binding Update for the route optimization from the mobile node (MN), registers information on a location of the mobile node (MN) in a binding cache (S502) Herein, the binding cache is a memory for storing a relationship between the Home address of the mobile node and the care-of address of the mobile node in a visited network. Thereafter, the mobile node (MN) forwards the normal packet to the correspondent node (CN) retaining the information on the location of the mobile node (MN) (S503).

Then, when forwarding the packet to the mobile node (MN), the correspondent node (CN) retaining the information on the location of the mobile node (MN) forwards the packet addressed not to the Home address of the mobile node (MN) but to the care-of address (S504).

Accordingly, this packet arrives at the mobile node (MN) via the optimized route without through the home address.

As a result, from this onwards, as far as the mobile node (MN) does not move, the packet from the correspondent node (CN) reaches the mobile node (MN) via the same route. Hence, a sequence reverse of the packets does not occur because no change of the route.

Next, a case where the mobile node (MN) detects a suspension of the continuous communication with the correspondent node (CN) and halts the route optimization between the mobile node (MN) and the correspondent node (CN) on the basis of Mobile-IPv6, will be explained referring to FIG. 6.

At first, the mobile node (MN), after setting the route optimization between the mobile node (MN) and the correspondent node (CN), monitors the communication with the correspondent node (CN) with the route optimization that is underway. Then, the mobile node (MN), when detecting that there is no communication with the correspondent node (CN) for a predetermined time, sends Binding Update for halting the route optimization to the correspondent node (CN) (S601). Thereafter, the mobile node (MN) stops a regular periodic transmission of Binding Update for maintaining the route optimization.

On the other hand, the correspondent node (CN) receiving Binding Update that halts the route optimization, deletes the information on the location of the mobile node (MN) from pieces of information managed by the self-node (S602).

It is therefore possible to halt the route optimization between the mobile node (MN) and the correspondent node (CN) that discontinue their communications. As a result, unnecessary resources on the correspondent node (CN) can be released in a way that restrains a futile transmission of datagram onto the network.

Explained referring to FIG. 7 is a modified example of the process in which the mobile node (MN) detects the suspension of the continuous communication between the mobile node (MN) and the correspondent node (CN) and halts the route optimization between the mobile node (MN) and the correspondent node (CN) on the basis of Mobile-IPv6. A different point from FIG. 6 is that the mobile node (MN) does not send Binding Update for halting the route optimization to the correspondent node (CN).

As in the case shown in FIG. 6, the mobile node (MN) after setting the route optimization between the mobile node (MN) and the correspondent node (CN), monitors the communication with the correspondent node (CN) with the route optimization that is underway. Then, the mobile node (MN), when detecting that there is no communication with the correspondent node (CN) for the predetermined time, stops the regular periodic transmission of Binding Update for maintaining the route optimization to the corresponding node (CN) (S701).

On the other hand, Binding Update for keeping the route optimization does not reach the correspondent node (CN), and a lifetime of the binding cache expires. Then, the correspondent node (CN) deletes the information on the location of the mobile node (MN) from the registration (S702).

It is therefore feasible to halt the route optimization between the mobile node (MN) and the correspondent node (CN) that discontinue their communications. As a result, unnecessary resources on the correspondent node (CN) can be released in a way that restrains the futile traffic (the futile transmission of datagram) onto the network.

A setting of a route re-optimization between the mobile node (MN) that has performed once the route optimization and the correspondent node (CN), will be explained referring to FIG. 8.

As shown in FIG. 5, when the mobile node (MN) performs the route optimization, the mobile node (MN) records, as the route optimization control information, the information of the correspondent node (CN) to which the route optimization has been carried out. When the mobile node (MN) starts communicating with the correspondent node (CN), the mobile node (MN) searches for the route optimization control information, wherein an IPv6 address of the correspondent node (CN) is used as information in an entry item of "IPv6 address of correspondent node", and an IPv6 address of the mobile node (MN) is used as information in an entry item of "IPv6 address of self-node". If a correspondent node (CN) with which to start the communication is the correspondent node (CN) with the route optimization carried out before, the mobile node (MN) sends Binding Update for the route optimization to the corespondent node (CN) before forwarding the normal packet (S801).

On the other hand, the correspondent node (CN) receiving Binding Update for the route optimization from the mobile node (MN) registers the information on the location of the mobile node (MN) (S802).

Thereafter, the mobile node (MN) forwards the normal packet to the correspondent node (CN) retaining the information on the location of the mobile node (MN) (S803).

Then, the correspondent node (CN) retaining the information on the location of the mobile node (MN), in the case of forwarding the packet to the mobile node (MN) forwards the packet addressed not to the home address of the mobile node (MN) but to the care-of address (S804).

Accordingly, this packet reaches the mobile node (MN) via the optimized route without through the home address.

As a result, from this onwards, as far as the mobile node (MN) does not move, the packet from the correspondent node (CN) reaches the mobile node (MN) via the same route. Hence, the sequence reverse of the packets does not occur because no change of the route.

Thus, the route re-optimization is executed between the mobile node (MN) having performed once the route optimization and the correspondent node (CN).

<Data Structure>

The route optimization control information recorded when performing the route optimization between the mobile node (MN) and the correspondent node (CN), will be explained with reference to FIG. 9. The mobile terminal (MN) manages the information required for controlling the route optimization as the route optimization control information as shown in FIG. 9. Note that the route optimization control information contains a plurality of entries each consisting of items 1 through 6 shown in FIG. 9. Further, when the mobile node (MN) executes the route optimization control, if there is no relevant entry within the route optimization information as a result of referring to the route optimization information, the mobile node (MN) adds an entry.

The route optimization information will be described based on the respective item numbers in FIG. 9. The item numbers 1 and 2 are stored with pieces of item information serving as a key for the entry. According to the first embodiment, the item numbers 1 and 2 are stored with the IPv6 addresses of the correspondent node (CN) and of the mobile node (MN).

The item number 3 is stored with route optimization states. The route optimization states are states of the route optimization between the nodes specified in this entry. In the first embodiment, "0" implies a case where the route optimization is attained, while "1" implies a case where the route optimization is not attained, thus representing the route optimization states.

The item number 4 is stored with route optimization halting methods. The route optimization halting methods are defined as control methods for halting the route optimization. In the first embodiment, "1" indicates the control method of halting the route optimization by "sending of Binding Update", and "2" indicates the control method of halting the route optimization by "halt of sending of Binding Update". Herein, "sending of Binding Update" is a method of halting the optimization by sending Binding Update for halting the route optimization when the mobile terminal (MN) stops the route optimization control. By contrast, "halt of sending of Binding Update" is a method of halting the optimization due to an expiration of the lifetime simply by the mobile node's (MN) stopping the sending of the regular periodic Binding Update.

The item number 5 is stored with a communication monitoring time. The communication monitoring time is a time for monitoring a continuation of the communication between the mobile node (MN) and the correspondent node (CN). The mobile node (MN) takes "2 bytes" as a time interval specified in this item, and checks communication monitoring states entered in the item number 6 indicated in the next item. According to the first embodiment, the communication monitoring time is set to "1-65535" but is not necessarily limited these values. The communication monitoring time may take "2 or larger bytes". A communication monitoring times "0" shall be, however, invalid.

The item number 6 is stored with the communication monitoring states. The communication monitoring states are states of monitoring the communication between the nodes specified in the entry. An initial value of the communication monitoring state is "on-the-suspension of communication". Then, when receiving the packet addressed to the mobile node (MN) from the correspondent node (CN), the state becomes "on-the-communication". Thereafter, when the communication monitoring time in the item number 5 elapses, this item is checked.

If the state "on-the-suspension of communication" is indicated in this item when the mobile node (MN) checks this item, it is judged that the continuous communication between the mobile node (MN) and the correspondent node (CN) is suspended, and the route optimization is halted based on the route optimization halting method specified in the item number 4.

<Security Association>

TABLE 1

| Route Optimization | Enable | Reject |
|---|---|---|
| CN1 | ■ | □ |
| CN2 | □ | ■ |
| CN3 | ■ | □ |
| CN4 | ■ | □ |
| — | — | — |
| — | — | — |

A security function, i.e., a security association implemented in the first embodiment will be explained referring to Table 1.

This security function is that the mobile node judges based on a security association database as shown in Table 1 whether the correspondent node is a node to which the route optimization may be executed or not. Namely, the mobile node searches for a source IP address from a "route optimization field", and judges which status of the route optimization, "enable" or "reject", is assigned to this IP address.

Further, without providing a pair of the "enable" field and the "reject" field, the mobile node may judge based on only the "enable" field whether the correspondent node is a node to which the route optimization can be executed or not. On this occasion, if an IP address of the sender is entered in the "route optimization enable field", the source node judges that the route optimization can be executed. On the other hand, if the IP address of the sender is not entered in the "route optimization enable field", the source node judges that the route optimization cannot be executed.

<Binding Cache>

TABLE 2

| Home Address | Care-of Address |
|---|---|
| A1.1 | A2.1 |
| A1.2 | A2.2 |
| A1.3 | A2.3 |
| — | — |
| — | — |

The binding cache will be described referring to Table 2. The binding cache is a memory for storing the relationship between the home address of the mobile node that is contained in Binding Update and the address (the care-of address) assigned in the visited network.

When the mobile node moves away from the self-home link, the packet forwarded by the correspondent node to the home address of the mobile node does not directly arrive at the mobile node. Namely, the packet addressed to the home address of the mobile node is forwarded via the home agent to the assigned address (the care-of address), thus reaching the mobile node.

Then, the correspondent node stores the relationship between the home address of the mobile node that is contained in Binding Update sent by the mobile node and the care-of address assigned after the mobile node has moved. Therefore, the correspondent node forwards the packet to the care-of address assigned after the mobile node has moved, whereby the packet can be forwarded to the mobile node without depending on the home agent.

<System Architecture>

Next, a flow of the route optimization control on the mobile node will be explained with reference to FIGS. 10 through 13.

FIG. 10 is a block diagram showing a control program, retained on the mobile node (MN), for executing the route optimization control. The control program on the mobile node (MN) is structured of a route optimization control processing module 1, a packet receipt processing module 2, a Mobile-IPv6 processing module 3 and a packet forwarding processing module 4. Further, the route optimization control processing module 1 is structured in a way that segments this module 1 into five processing modules and the route optimization control information.

Then, the five processing modules within the route optimization processing module actualize the route optimization control with reference to the route optimization control information. Contents of processes by the respective processing modules will hereinafter be outlined.

To start with, a communication monitoring module 11 compares the received packet with the route optimization control information, thereby controlling the communication monitoring state. A route optimization control information registration module 12, if an new entry is not yet registered in the route optimization information, this entry is added to the route optimization information. A route optimization control judging module 13 judges whether the route optimization control is executed or not, A route optimization starting module 14 requests the route optimization control information registration module 12 to add a new entry, requests the route optimization control judging module 13 to judge whether the route optimization control is executed or not, and requests a Binding Update generating/transmitting module 31 of the Mobile-IPv6 processing module to generate and transmit Binding Update for the route optimization. A communication monitoring timer module 15 checks the communication monitoring states in the entry within the route optimization control information, and requests the Binding Update generating/transmitting module 31 of the Mobile-IPv6 processing module 3 to generate and transmit Binding Update.

Next, an operation of starting the route optimization control will be discussed referring to FIG. 11.

To start with, the packet forwarding processing module 4 receives from a high-order layer a request for forwarding the packet (S1101). Then, the packet forwarding processing module 4 invokes a route optimization starting module 14 within the route optimization control processing module 1 (S1102).

In response to this operation, the route optimization starting module 14 requests the route optimization control judging module 13 to judge whether the route optimization control is executed or not (S1103).

Then, if the route optimization control judging module 13 judges that the route optimization control be executed, the route optimization starting module 14 requests the Binding Update generating/transmitting module 31 of the Mobile-IPv6 processing module to generate and transmit Binding Update for the route optimization (S1104).

Subsequently, the Binding Update generating/transmitting module 31 generates Binding Update, and requests the packet forwarding processing module 4 to forward Binding Update (s1105). Thereafter, the packet forwarding processing module 4 forwards Binding Update (S1106). At this time, the packet forwarding processing module 4 can send Binding Update by the piggy backing system for the packet of which the forwarding is requested by the high-order layer.

On the other hand, the route optimization starting module 14, after making the request for generating and transmitting Binding Update, requests the route optimization control information registration module 12 to add the new entry (S1107).

In response to this request, the route optimization control information registration module 12 refers to the route optimization control information and, if necessary, registers the new entry. Namely, if the new entry is not yet registered within the route optimization control information, the route optimization control information registration module 12 adds the new entry to the route optimization control information.

Further, the route optimization starting module 14, for monitoring the communications, boots the communication monitoring timer module 15 within the route optimization control information and makes this module 15 monitor an elapse of time.

The route optimization starting module 14, after executing the above process, brings the control back to the packet forwarding processing module 4. Then, the packet forwarding processing module 4 forwards the packet requested to be forwarded (S1108). This packet is an entity of the data that should be forwarded to the correspondent node (CN) from the mobile node (MN).

Next, a communication monitoring operation of the route optimization control will be explained referring to FIG. 12.

To start with, the packet receipt processing module 2 receives the input packet (S1201). Then, the packet receipt processing module 2 invokes the communication monitoring module 11 of the route optimization control processing module (S1202).

In response to this operation, the communication monitoring module 11 compares the received packet with the route optimization control information. Then, when the entry is set in the route optimization control information, the communication monitoring module 1 changes the communication monitoring state to "on-the-communication" from "on-the-suspension of communication".

The communication monitoring module 11, after executing the process described above, returns the control to the packet forwarding processing module 2 and notifies the high-order layer of the packet received (S1203).

Next, an operation of stopping the route optimization control will be described referring to FIG. 13.

As explained in FIG. 11, the route optimization starting module 14 starts the timer by use of the communication monitoring module 11 in order to monitor the communications. The route optimization starting module 14, if the timer falls into timeout, invokes the communication monitoring timer module 15 within the route optimization control processing module 1 (S1301).

Then, the communication monitoring timer module 15 checks the communication monitoring states in the entry within the route optimization control information. Subsequently, the communication monitoring timer module 15, if the communication monitoring state indicates "on-the-suspension of communication", judges that the communication from the correspondent node (CN) to the mobile node (MN) is suspended. At this time, the communication monitoring timer module 15 requests the Binding Update generating/transmitting module 31 of the Mobile-IPv6 processing module 3 to generate and transmit Binding Update for halting the route optimization (S1302). This request is, however, made only when the route optimization halting method in the entry within the route optimization control information is the "sending of Binding Update".

In response to this request, the Binding Update generating/transmitting module 31 generates Binding Update and requests the packet forwarding processing module 4 to send Binding Update (S1303). Then, the packet forwarding processing module 4 sends Binding Update (S1304).

After executing the process described above, the communication monitoring timer module 15 requests a Binding Update regular periodic sending module 32 in the Mobile-IPv6 processing module 3 to halt the regular periodic transmission thereof in order to halt the regular periodic transmission of Binding Update (S1305). In response to this request, the Binding Update regular periodic sending module 32 stops the timer for the regular periodic transmission.

<Processing Flow of Route Optimization Control>

A processing flow of the route optimization control on the mobile node in the first embodiment, will be explained referring to FIGS. 14 through 18. FIG. 14 is a flowchart showing a start of the route optimization control in the first embodiment.

To begin with, the packet receipt processing module 2 starts a packet receiving process upon receiving a packet forwarding request from the high-order layer (S1401).

Then, the route optimization control processing module 1 judges whether the route optimization control is executed or not (S1402). Note the process of judging whether the route optimization control is executed or not will be described in depth later on.

Thereafter, the route optimization control processing module 1 boots the communication monitoring timer module 15 in a way that sets the communication monitoring time of the route optimization control information to a timer value (S1406), and advances the control to a process in S1407. Then, the packet forwarding processing module 4 executes a normal packet forwarding process (S1407) and terminates the control.

On the other hand, the route optimization control processing module 1, when judging in S1403 that the route optimization process is not executed, advances the control to the process in S1407. Ensuingly, the packet forwarding processing module 4 executes the normal packet forwarding process (S1407) and finishes the control.

The judgement as to the route optimization control in the first embodiment will be explained referring to FIG. 15. This is a detailed discussion on the process in S1402 shown in FIG. 14.

At first, the packet forwarding processing module 4 receives the packet forwarding request, which triggers a start of the process of judging the route optimization control by the route optimization control processing module 1 (S1501).

Then, the route optimization control processing module 1 judges whether or not the entry concerned is already registered in the route optimization control information (S1502). Herein, "the entry is already registered in the route optimization control information" implies that the route optimization control information contains such an entry that a destination address is coincident with the IPv6 address of the corespondent node, and a source address is coincident with the IPv6 address of the self-node.

The route optimization control processing module 1, when judging in S1502 that the entry concerned is already registered in the route optimization control information, advances the control to S1503. Subsequently, the route optimization control processing module 1 judges a route optimization state (S1503). Herein, the "route optimization state" is a present state of the route optimization between the self-node and the correspondent node. Namely, this state indicates any one of "on-the-optimization of route" and "not-yet-optimized route".

The route optimization control processing module 1, when judging in S1503 that the route optimization state is "not-yet-optimized route", advances the control to S1504. Subsequently, the route optimization control processing module 1 sets "execution of the route optimization process" in a return value, and finishes the control.

By contrast, the route optimization control processing module 1, when judging in S1503 that the route optimization state is "on-the-optimization of route", advances the control to S1505. Then, the route optimization control processing module 1 sets. "non-execution of the route optimization process" in the return value, and terminates the control.

Further, the route optimization control processing module 1, when judging in S1502 that the entry concerned is not already registered in the route optimization control information, advances the control to S1506.

Next, the route optimization control processing module 1 judges whether the security association is established or not (S1506). Herein, the route optimization control processing module 1, when judging that the security association is established, sets "execution of the route optimization process" in the return value, and finishes the control.

While on the other hand, the route optimization control processing module 1, when judging in S1506 that the security association is not yet established; sets "non-execution of the route optimization process" in the return value, and terminates the control.

A registration of information about the route optimization control in the first embodiment will be explained with reference to FIG. 16. This is a detailed explanation of the process in S1405 shown in FIG. 14. Note that the route optimization control information is described in FIG. 9.

This process is a process (S1601) in which the Mobile-IPv6 processing module 3 generates Binding Update for the route optimization and requests the packet forwarding processing module 4 to send Binding Update, whereby the route optimization control processing module 1 registers the information about the route optimization control.

In this process, at first, the route optimization control processing module 1 judges whether or not the entry concerned is already registered in the route optimization control information (S1602). Herein, "the entry is already registered in the route optimization control information" implies that the route optimization control information contains such an entry that a destination address is coincident with the IPv6 address of the corespondent node, and a source address is coincident with the IPv6 address of the self-node.

Herein, the route optimization control processing module 1, when judging that the entry concerned is not yet registered in the route optimization control information, advances the control to S1603 (S1602). Subsequently, the route optimization control processing module 1 adds this entry t the route optimization control information (S1603).

Thereafter, the route optimization control processing module 1 initializes the route optimization control information (S1604), and finishes the control (S1606).

Pieces of information initialized herein are, as shown in FIG. 9, the IPv6 address of the correspondent node, the IPv6 address of the self-node, the route optimization information, the route optimization halting method, the communication monitoring time and the communication monitoring state. Namely, the route optimization control processing module 1 sets a destination IPv6 address and a source IPv6 address contained in the forwarding packet respectively in the item "IPv6 address of corresponding node" and in the item "IPv6 address of self-node" within the route optimization control information.

Further, the route optimization control processing module 1 sets the route optimization information to "on-the-optimization of route" and sets the communication monitoring state to "on-the-suspension of communication".

On the other hand, the route optimization control processing module 1, when judging in S1602 that the entry is already registered in the route optimization control information, advances the control to S1605.

Then, the route optimization control processing module 1 sets the route optimization state in the route optimization control information to "on-the-optimization of route" (S1605), and terminates the control (S1606).

A communication monitoring process of the route optimization control in the first embodiment will be described referring to FIG. 17. To begin with, a start of the packet receiving process by the route optimization control processing module 1 is triggered by receiving the packet by the packet receipt processing module 2 (S1701).

Next, the route optimization control processing module 1 judges whether or not the entry is already registered in the route optimization control information (S1702). Herein, "the entry is already registered in the route optimization control information" implies that the route optimization control information contains such an entry that a destination address is coincident with the IPv6 address of the corespondent node, and a source address is coincident with the IPv6 address of the self-node.

Herein, the route optimization control processing module 1, when judging that the entry concerned is already registered in the route optimization control information, advances the control to S1703.

Then, the route optimization control processing module 1 sets the communication monitoring state in the route optimization control information to "on-the-communication" (s1703). Ensuingly, the packet receipt processing module 2 executes the normal packet receiving process (S1704), and finishes the control (S1705).

While on the other hand, the route optimization control processing module 1, when judging in S1702 that the entry is not yet registered in the route optimization control information, advances the control S1704. Then, the packet receipt processing module 2 executes the normal packet receiving process (S1704), and finishes the control (S1705).

A halt of the route optimization control in the first embodiment will be explained referring to FIG. 18. At first, the route optimization control processing module 1, with such a trigger that the communication monitoring timer module 15 falls into timeout, starts a communication monitoring timer timeout process (S1801).

Subsequently, the route optimization control processing module 1 reads the route optimization control information, and judges whether the communication monitoring state is set to "on-the-communication" or "on-the-suspension of communication" (S1802).

Herein, if the communication monitoring state is set to "on-the-suspension of communication", the route optimization control processing module 1 judges that the communication from the correspondent node (CN) to the mobile node (MN) is suspended, and advances the control to S1803.

Then, the route optimization control processing module 1 makes a judgement about the route optimization halting method (S1803). Applied as the route optimization halting method in the first embodiment are two methods, i.e., a method (sending of Binding Update) of giving an explicit instruction of halting the route optimization by sending Binding Update and a method (halt of sending of Binding Update) of halting the route optimization due to an expiration of lifetime by halting the periodic transmission of Binding Update. These two methods may not necessarily be applied.

Herein, if the route optimization control processing module 1 judges that the route optimization halting method be set to "sending of Binding Update", the Mobile-IPv6 processing module 3 generates Binding Update. Then, the Mobile-IPv6 processing module 3 requests the packet forwarding processing module 4 to send Binding Update, and advances the control to S1805.

On the other hand, the route optimization control processing module 1, when judging in S1803 that the route optimization halting method be set to "halt of sending of Binding Update", advances the control to S1805 (S1803).

Subsequently, the packet forwarding processing module 4 halts the regular periodic transmission of Binding Update (S1805). Herein, the route optimization control processing module 1 stops a regular periodic transmission timer in order to halt the regular periodic transmission of Binding Update for keeping the route optimization.

Thereafter, the route optimization control processing module 1 sets the route optimization state in the route optimization control information to "not-yet-optimized route" (S1806), and terminates the control (S1809).

By contrast, the route optimization control processing module 1, when judging in S1802 that the communication monitoring state be set to "on-the-communication", sets the communication monitoring state in the route optimization control information to "on-the-suspension of communication" (S1807).

Then, the route optimization control processing module 1 restarts the communication monitoring timer (S1808) and finishes the control (S1809).

Second Embodiment

A second embodiment of the route optimization control method will be discussed with reference to FIGS. 19 through 22. A difference from the first embodiment is that the mechanism for maintaining the connectivity between the mobile node (MN) and the correspondent node (CN) is based on a Hierarchical Mobile-IPv6 system (which will hereinafter simply termed the Hierarchical Mobile-IPv6).

Figure 19:
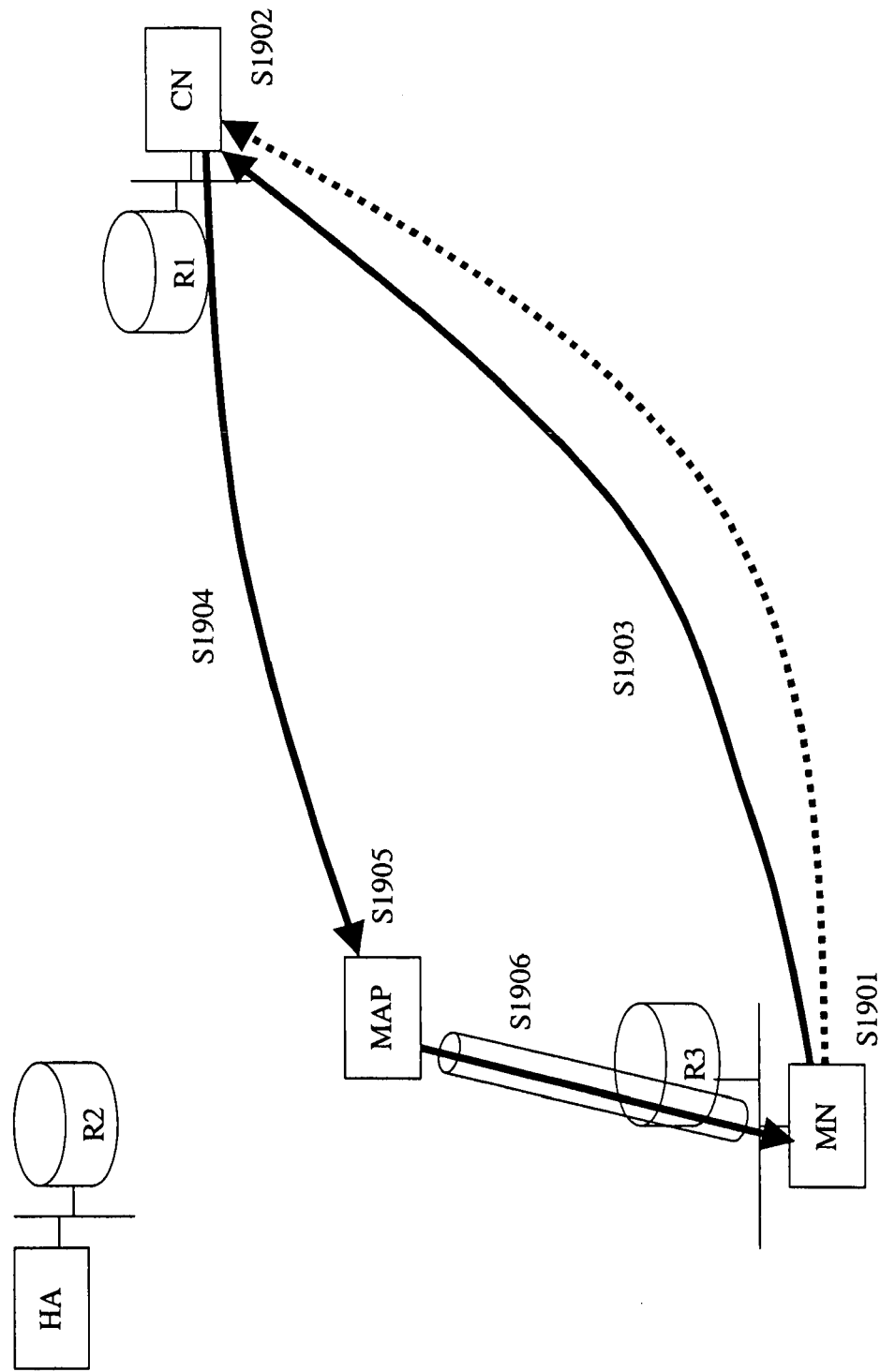
FIG. 19 is a view showing how the route optimization based on Hierarchical Mobile-IPv6 is set.

Referring to FIG. 19, the symbol MN represents the mobile node, and CN designates the correspondent node. Further, HA represents for the home agent, and MAP denotes a mobility anchor point.

To start with, the mobile node (MN), when a communication with the correspondent node (CN) occurs, confirms that the security association between the mobile node (MN) and the correspondent node (CN) is established. Then, if the security association is established, the mobile node (MN) judges that the route optimization between the mobile node (MN) and the correspondent node (CN) can be performed, and sends Binding Update before starting the communication in order to execute the route optimization to the correspondent node (CN) (S1901). At this time, Binding Update may be sent as a normal packet destination header on the basis of the piggy backing system. This Binding Update contains a regional care-of-address.

Further, on this occasion, the mobile node (MN) records, as the route optimization control information (see FIG. 9), the information on the correspondent node (CN) to which the route optimization has been effected.

On the other hand, the correspondent node (CN) receiving, from the mobile node (MN), Binding Update for the route optimization registers the information about the location of the mobile node (MN) (S1902). Thereafter, the mobile node (MN) forwards the normal packet to the correspondent node (CN) retaining the information about the location of the mobile node (MN) (S1903).

Then, in the case of forwarding the packet to the mobile node (MN), the correspondent node (CN) retaining the information about the location of the mobile node (MN) forwards the packet addressed not to the home address of the mobile node (MN) but to the regional care-of address (S1904).

Hence, this packet reaches the mobility anchor point via the optimized route without through the home agent (S1905).

On the other hand, the mobility anchor point, when receiving the packet addressed to the regional care-of address, encapsulates this packet assigned an on-link care-of address and forwards this encapsulated packet to the mobile node (MN). Namely, the mobility anchor point forwards the packet addressed to the regional care-of address to the on-link care-of address associated with the home address of the mobile node (MN). Thus, the packet arrives at the mobile node (MN) (S1906). Accordingly, from this onwards, as far as the mobile node (MN) does not move, the packet from the correspondent node (CN) reaches the mobile node (MN) via the same route. As a result, a sequence reverse of the packets does not occur because no change of the route.

Next, a case where the mobile node (MN) detects that the continuous communication between the mobile node (MN) and the correspondent node (CN) is suspended, and the route optimization between the mobile node (MN) and the correspondent node (CN) is halted on the basis of Hierarchical Mobile-IPv6, will be explained referring to FIG. 20.

At first, the mobile node (MN), after setting the route optimization between the mobile node (MN) and the correspondent node (CN), monitors the communication with the correspondent node (CN) with the route optimization that is underway. Then, the mobile node (MN), when detecting that the communication between the mobile node (MN) and the correspondent node (CN) does not occur for a predetermined time, sends Binding Update for halting the route optimization to the correspondent node (CN) (S2001). Thereafter, the transmission of regular periodic Binding Update for keeping the route optimization is stopped.

On the other hand, the correspondent node (CN) having received Binding Update for halting the route optimization deletes the information on the location of the mobile node (MN) from the information managed by the self-node (S2002).

It is therefore possible to halt the route optimization between the mobile node (MN) and the correspondent node (CN), which discontinue their communications. As a result, unnecessary resources on the correspondent node (CN) can be released in a way that restrains a futile traffic onto the network.

Figure 20:
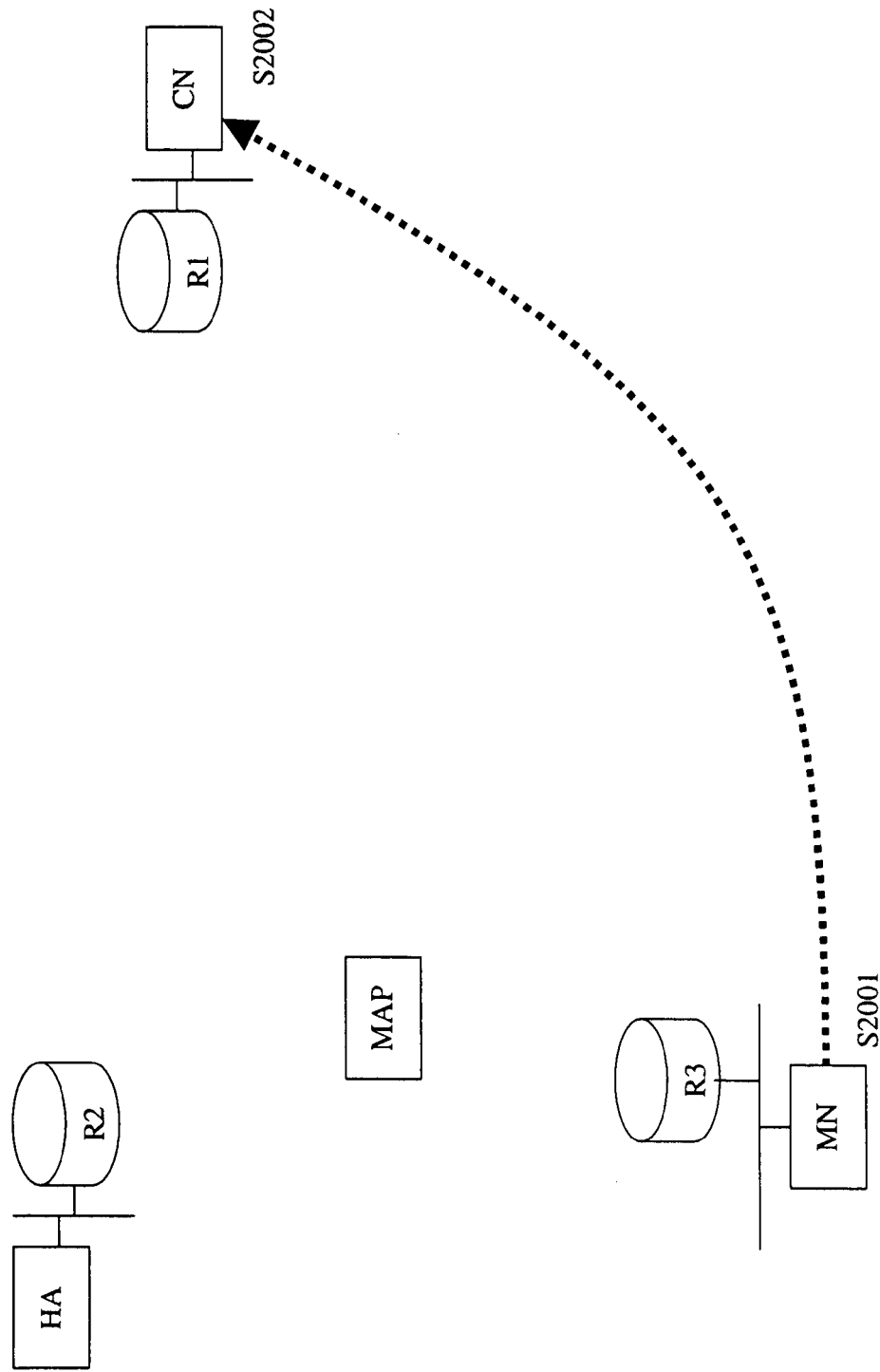
FIGS. 20 and 21 are views showing how the route optimization based on Hierarchical Mobile-IPv6 is halted.
Figure 21:
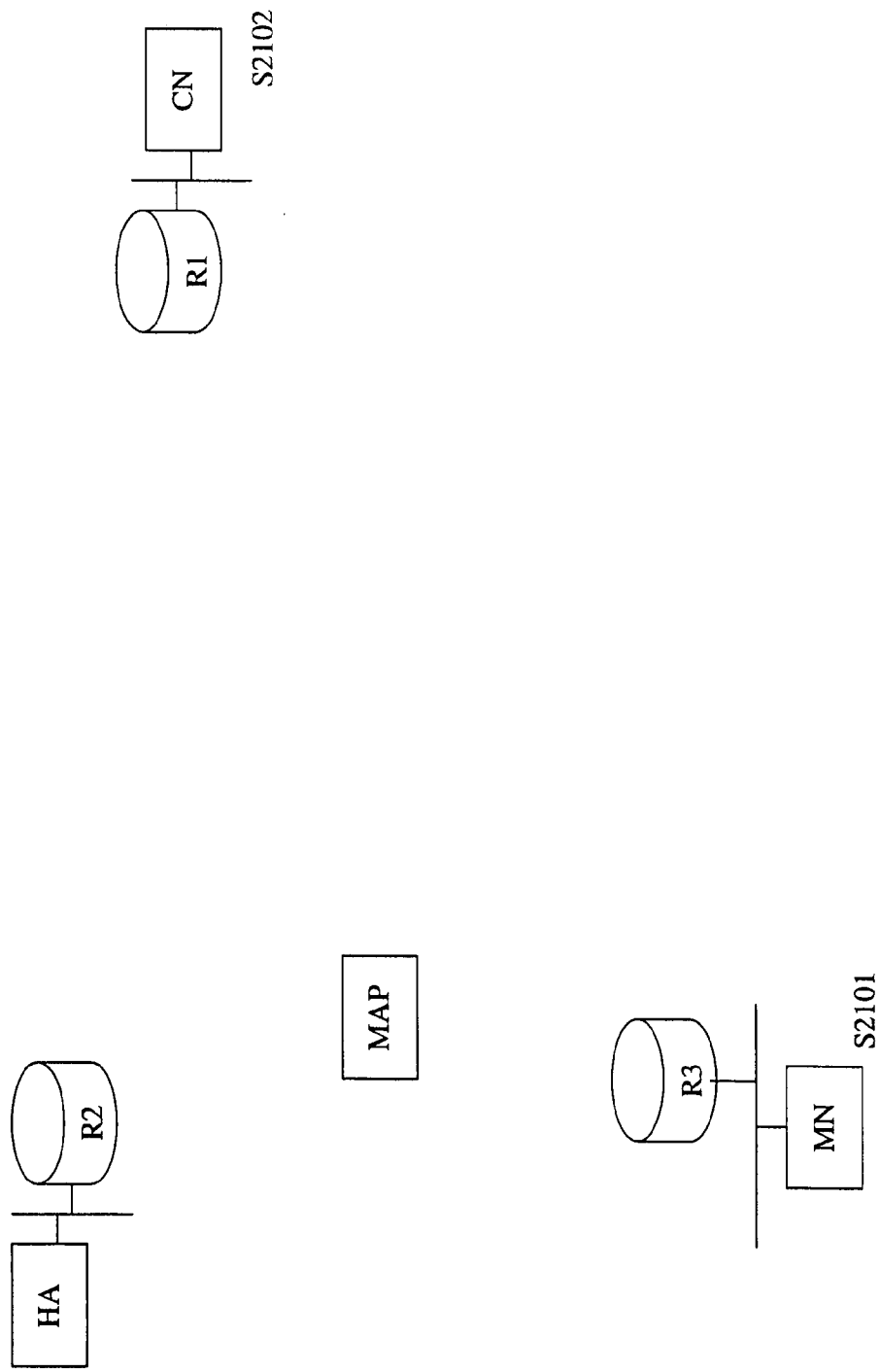

Explained referring to FIG. 21 is another embodiment in a case where the mobile node (MN) detects that the continuous communication between the mobile node (MN) and the correspondent node (CN) is suspended and halts the route optimization between the mobile node (MN) and the correspondent node (CN) on the basis of Mobile-IPv6. A different point from FIG. 20 is that the mobile node (MN) does not send Binding Update for halting the route optimization to the correspondent node (CN).

As in the case shown in FIG. 20, the mobile node (MN), after setting the route optimization between the mobile node (MN) and the correspondent node (CN), monitors the communication with the correspondent node (CN) with the route optimization that is underway. Then, the mobile node (MN), when detecting that there is no communication with the correspondent node (CN) for the predetermined time, stops the regular periodic transmission of Binding Update for maintaining the route optimization to the corresponding node (CN) (S1101).

On the other hand, Binding Update for keeping the route optimization does not reach the correspondent node (CN), and a lifetime of the binding cache expires. Then, the correspondent node (CN) deletes the information on the location of the mobile node (MN) from the registration (S2102).

It is therefore feasible to halt the route optimization between the mobile node (MN) and the correspondent node (CN) that discontinue their communications. As a result, unnecessary resources on the correspondent node (CN) can be released in a way that restrains the futile traffic onto the network.

Figure 22:
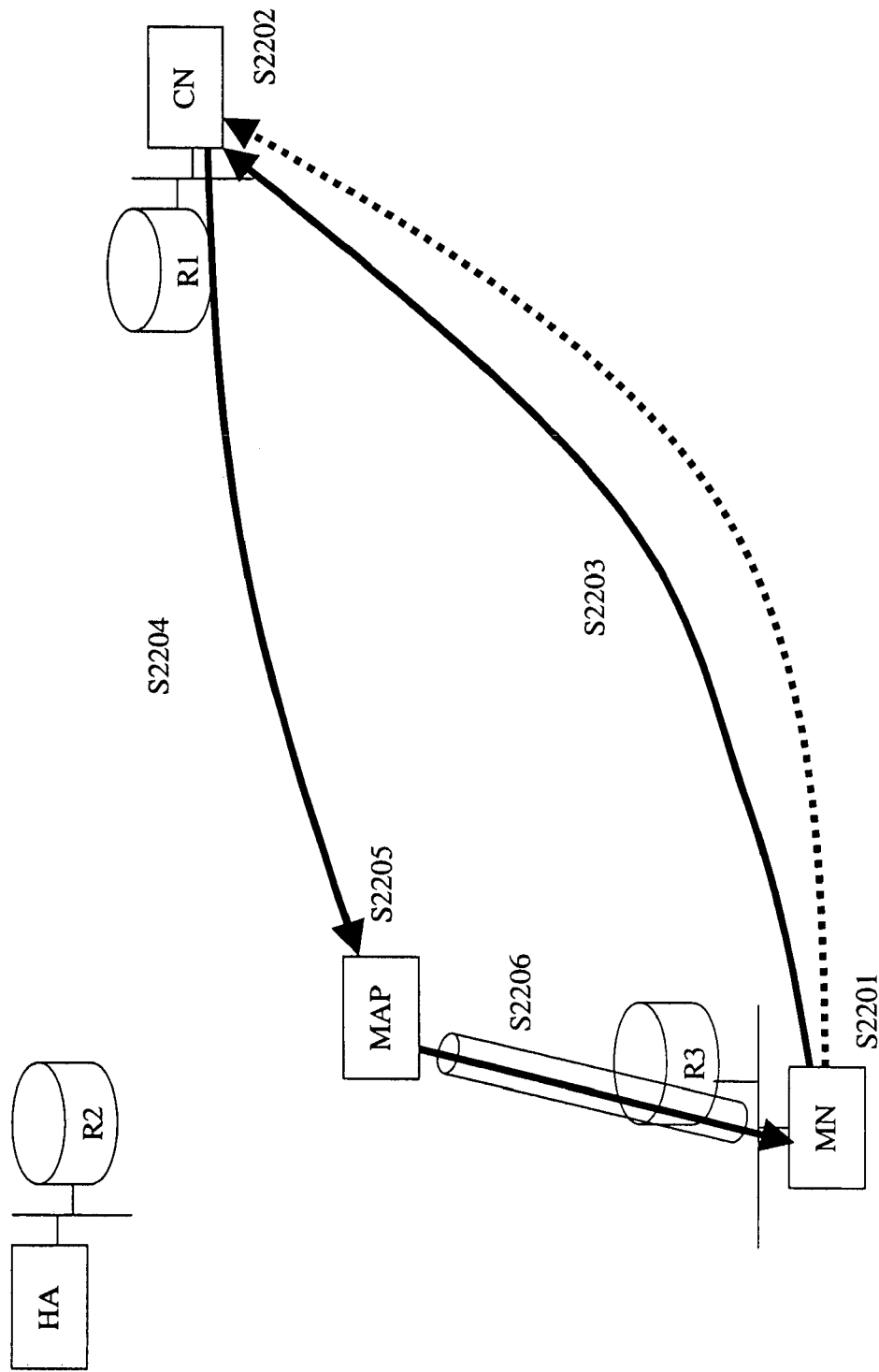
FIG. 22 is a view showing how a route re-optimization based on Hierarchical Mobile-IPv6 is set.

An application of a route re-optimization between the mobile node (MN) that has applied once the route optimization and the correspondent node (CN) on the basis of Hierarchical Mobile-IPv6 will be explained referring to FIG. 22.

As shown in FIG. 9, when the mobile node (MN) executes the route optimization, the mobile node (MN) records, as the route optimization control information, the information of the correspondent node (CN) to which the route optimization has been carried out. When the mobile node (MN) starts communicating with the correspondent node (CN), the mobile node (MN) searches for the route optimization control information, wherein an IPv6 address of the correspondent node (CN) is used as information in an entry item of IPv6 address of correspondent node, and an IPv6 address of the mobile node (MN) is used as information in an entry item of IPv6 address of self-node. If a correspondent node (CN) is the correspondent node (CN) to which the mobile node (MN) has applied the route optimization before, the mobile node (MN) sends Binding Update for the route optimization to the corespondent node (CN) before forwarding the packet (S2201).

On the other hand, the correspondent node (CN) receiving Binding Update for the route optimization from the mobile node (MN) registers the information on the location of the mobile node (MN) (S2202).

Thereafter, the mobile node (MN) forwards the packet to the correspondent node (CN) retaining the information on the location of the mobile node (MN) (S2203).

Then, the correspondent node (CN) retaining the information on the location of the mobile node (MN), in the case of forwarding the packet to the mobile node (MN) forwards the packet addressed not to the home address of the mobile node (MN) but to the regional care-of address (S2204).

This packet reaches the mobile node (MN) via the optimized route without through the home address.

On the other hand, the mobility anchor point, when receiving the packet addressed to the regional care-of address, encapsulates this packet and forwards this encapsulated packet to an on-link care-of address. Subsequently, the packet arrives at the mobile node (MN) (S2206).

Then, from this onwards, as far as the mobile node (MN) does not move, the packet from the correspondent node (CN) reaches the mobile node (MN) via the same route. Hence, the sequence reverse of the packets does not occur because no change of the route.

Thus, the route re-optimization is applied between the mobile node (MN) having applied once the route optimization and the correspondent node (CN).

Moreover, the Hierarchical Mobile-IPv6 based system architecture for the route optimization control and the operation thereof are common to those based on Mobile-IPv6 described above, and hence their explanations are omitted herein.

<Readable-by-Computer Recording Medium>

A program read by a computer to execute any one of the processes in the embodiments discussed above can be stored on a readable-by-computer recording medium. Then, the computer reads and executes the program on this recording medium, whereby the functions of the communication method exemplified in the embodiments discussed above can be provided.

Herein, the readable-by-computer recording medium includes recording mediums capable of storing information such as data, programs, etc. electrically, magnetically, optically and mechanically or by chemical action, which can be read by the computer. What is demountable out of the computer among those recording mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and soon are classified as fixed type recording mediums within the computer.

As discussed above, according to the present invention, it is possible to provide the communication method capable of preventing the occurrence of the change of the route on which the communication between the mobile node and the correspondent node is underway, and of restraining the unnecessary process of forwarding the packet to the correspondent node from the mobile node.

This invention being thus described, it will be obvious that it may be varied in various ways. Such variations are not to be regarded as departure from the spirit and scope of the invention, and all such modifications would be obvious for one skilled in the art intended to be included within the scope of the following claims.

What is claimed is:

1. A communication method executed among a mobile terminal having a home address assigned in a first network and a temporary address assigned in a second network, an agent device surrogating a communication using the home address in the first network and a correspondent terminal communicating with said mobile terminal through said agent device, said communication method comprising:

making said mobile terminal transmit, when said mobile terminal moves to the second network, information containing the temporary address to said correspondent terminal;

making said correspondent terminal receive the information containing the temporary address of said mobile terminal; and making said correspondent terminal transmit, to said mobile terminal, the information addressed to the temporary address of said mobile terminal, wherein a communication route without through said agent device is established in advance of starting the communication between said mobile terminal and said correspondent terminal.

2. A communication method according to claim 1, further comprising confirming before starting the communication between said mobile terminal and said correspondent terminal whether a request for security is met or not.

3. A communication method according to claim 1, further comprising:
   detecting that there is no communication between said mobile terminal and said correspondent terminal for a predetermined period; and
   transmitting, when detecting that there is no communication between said mobile terminal and said correspondent terminal, a piece of information for canceling the communication route.

4. A communication method according to claim 1, further comprising:
   detecting that there is no communication between said mobile terminal and said correspondent terminal for the predetermined period; and
   stopping, when detecting that there is no communication between said mobile terminal and said correspondent terminal, a transmission of a piece of information for keeping the communication route.

5. A communication method according to claim 1, further comprising:
   storing information showing that the communication route without through said agent device is once established between said mobile terminal and said correspondent terminal; and
   re-establishing the communication route without through said agent device on the basis of the information stored with respect to the communication route.

6. A communication method according to claim 1, further comprising making said correspondent terminal register information about a location of said mobile terminal on the basis of a piggy backing system before starting the communication between said mobile terminal and said correspondent terminal.

7. A communication method executed among a mobile terminal having a home address assigned in a first network and a first temporary address and a second temporary address assigned in a second network, a first agent device surrogating a communication using the home address in the first network, a second agent device surrogating a communication using the first temporary address, and a correspondent terminal communicating with said mobile terminal through said first agent device and said second agent device, said communication method comprising:
   making said mobile terminal transmit, when said mobile terminal moves to the second network, information containing the temporary address to said correspondent terminal;
   making said correspondent terminal receive the information containing the temporary address of said mobile terminal;
   making said correspondent terminal transmit, to said mobile terminal, the information addressed to the temporary address of said mobile terminal; and
   making said second agent device transmit, to said mobile terminal, information addressed to the second temporary address,
   wherein a communication route without through said first agent device is established in advance of starting the communication between said mobile terminal and said correspondent terminal.

8. A communication method according to claim 7 further comprising confirming before starting the communication between said mobile terminal and said correspondent terminal through said second agent device whether a request for security is met or not.

9. A communication method according to claim 7, further comprising:
   detecting that there is no communication between said mobile terminal and said correspondent terminal for a predetermined period; and
   transmitting, when detecting that there is no communication between said mobile terminal and said correspondent terminal, a piece of information for canceling the communication route.

10. A communication method according to claim 7, further comprising:
   detecting that there is no communication between said mobile terminal and said correspondent terminal for the predetermined period; and
   stopping, when detecting that there is no communication between said mobile terminal and said correspondent terminal, a transmission of a piece of information for keeping the communication route.

11. A communication method according to claim 7, further comprising:
   storing information showing that the communication route without through said first agent device is once established between said mobile terminal and said correspondent terminal; and
   re-establishing the communication route without through said first agent device on the basis of the information stored with respect to the communication route.

12. A communication method according to claim 7, further comprising making said correspondent terminal register information about a location of said mobile terminal on the basis of a piggy backing system before starting the communication between said mobile terminal and said correspondent terminal.

13. A terminal device utilized among a mobile terminal having a home address assigned in a first network and a temporary address assigned in a second network, an agent device surrogating a communication using the home address in the first network and a correspondent terminal communicating with said mobile terminal through said agent device, said terminal device comprising:
   a transmitting module transmitting, when said mobile terminal moves to the second network, location information containing the temporary address to said correspondent terminal; and
   a receiving module receiving information transmitted by said correspondent terminal;
   wherein a communication route without through said agent device is established in advance of starting the communication between said mobile terminal and said correspondent terminal.

14. A terminal device according to claim 13, further comprising a security judging module confirming before starting the communication between said mobile terminal and said correspondent terminal whether a request for security is met or not.

15. A terminal device according to claim 13, further comprising:
   a communication monitoring module monitoring a communication state between said mobile terminal and said correspondent terminal; and
   a route canceling module transmitting, when detecting that there is no communication between said mobile terminal and said correspondent terminal for a predetermined period, apiece of information for canceling the communication route.

16. A terminal device according to claim 13, further comprising:

a communication monitoring module detecting that there is no communication between said mobile terminal and said correspondent terminal for the predetermined period; and a stopping module stopping, when detecting that there is no communication between said mobile terminal and said correspondent terminal, a transmission of a piece of information for keeping the communication route.

17. A terminal device according to claim 13, further comprising:

a storing module storing information showing that the communication route without through said agent device is once established between said mobile terminal and said correspondent terminal; and a communication route re-establishing module re-establishing the communication route without through said agent device on the basis of the information stored with respect to the communication route.

18. A terminal device utilized among a mobile terminal having a home address assigned in a first network and a first temporary address and a second temporary address assigned in a second network, a first agent device surrogating a communication using the home address in the first network, a second agent device surrogating a communication using the first temporary address, and a correspondent terminal communicating with said mobile terminal through said first agent device and said second agent device, said terminal device comprising:

a transmitting module transmitting, when said mobile terminal moves to the second network, information containing the first temporary address to said correspondent terminal;

a receiving module receiving information addressed to the second temporary address that is transmitted by said second agent device; and a communication route establishing module establishing a communication route without through said first agent device in advance of starting the communication between said mobile terminal and said correspondent terminal.

* * * * *